Figure 27:
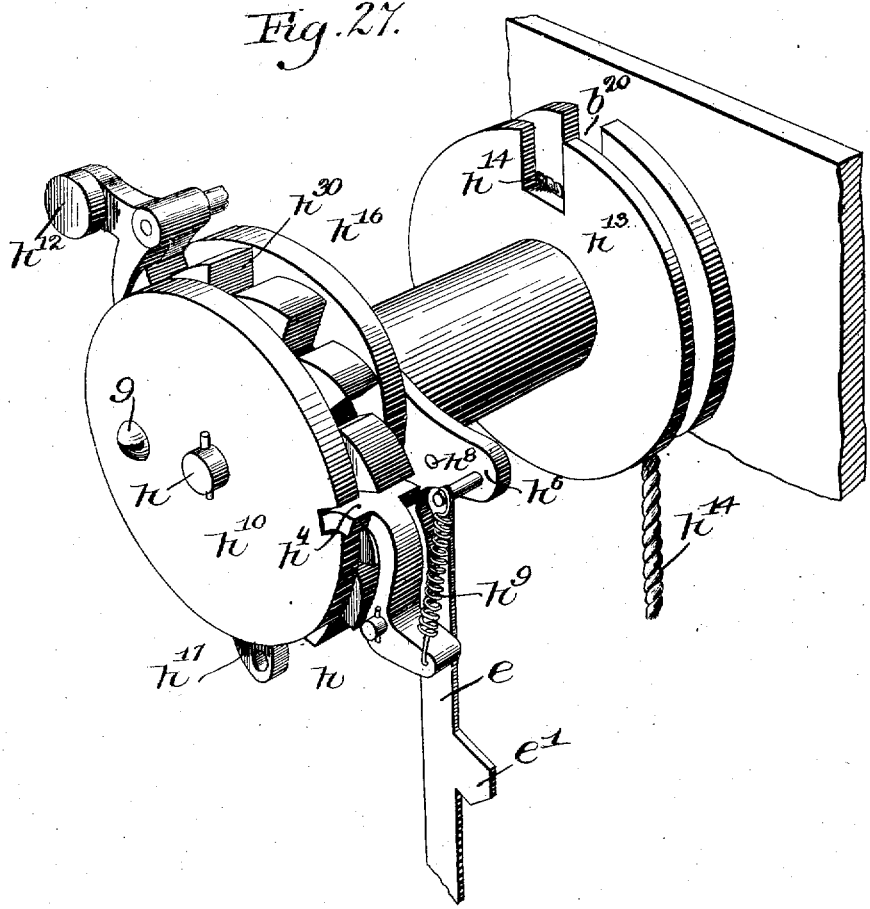

No. 608,923. Patented Aug. 9, 1898.
A. SNOECK.
VOTING MACHINE.
(Application filed Mar. 7, 1895.)
(No Model.) 13 Sheets—Sheet 1.
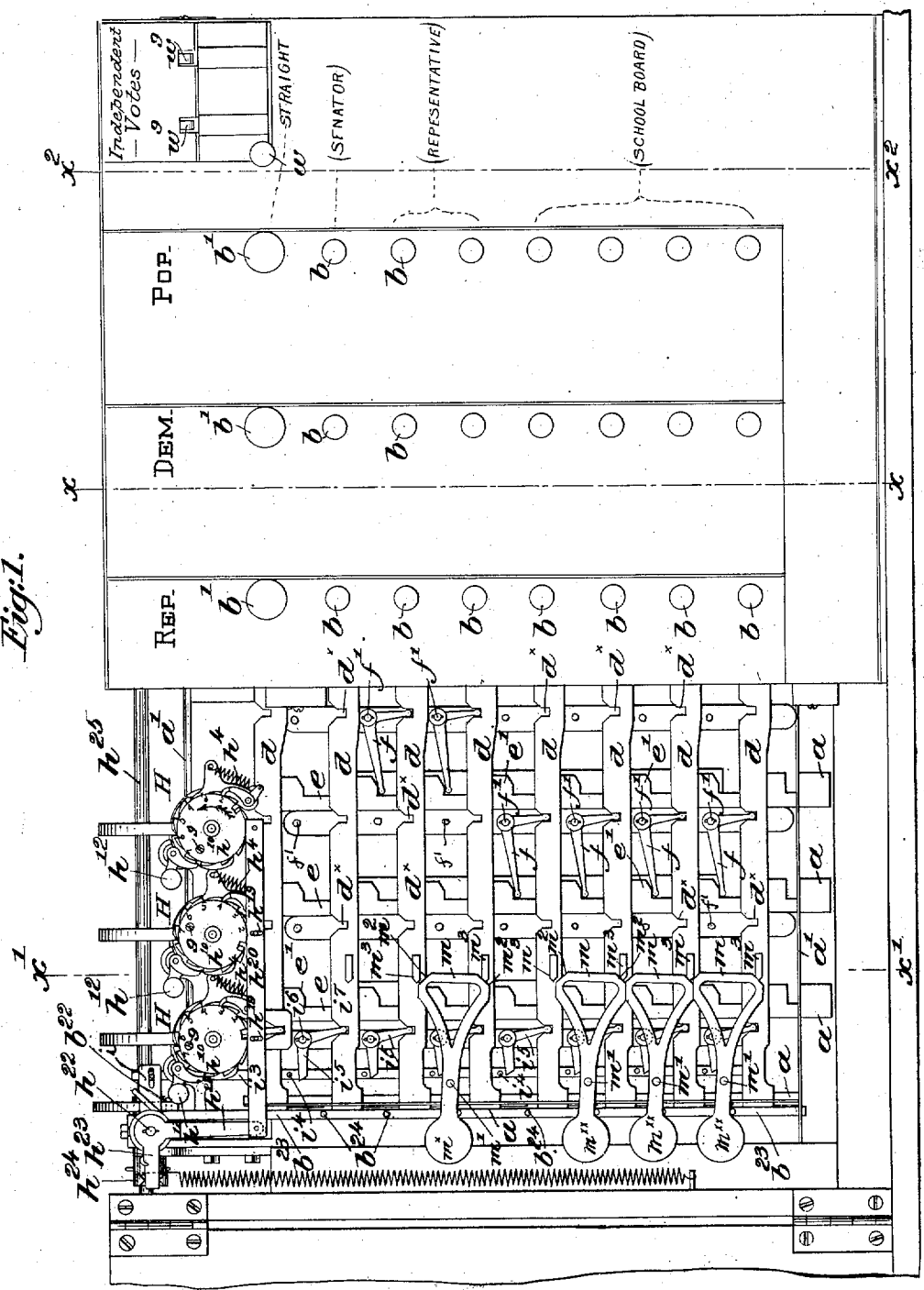

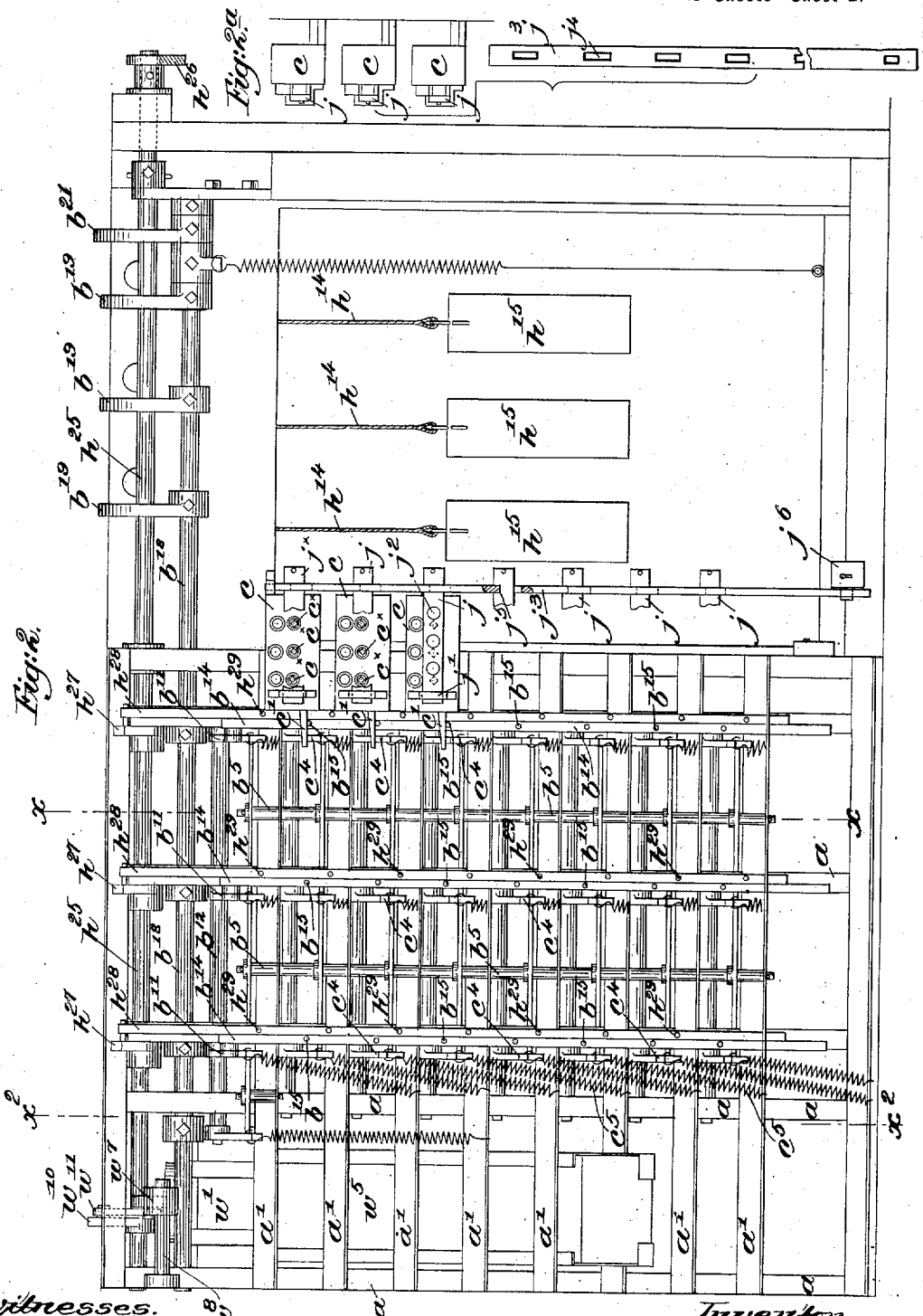

No. 608,923. Patented Aug. 9, 1898.
A. SNOECK.
VOTING MACHINE.
(Application filed Mar. 7, 1895.)
(No Model.) 3 Sheets—Sheet 3.
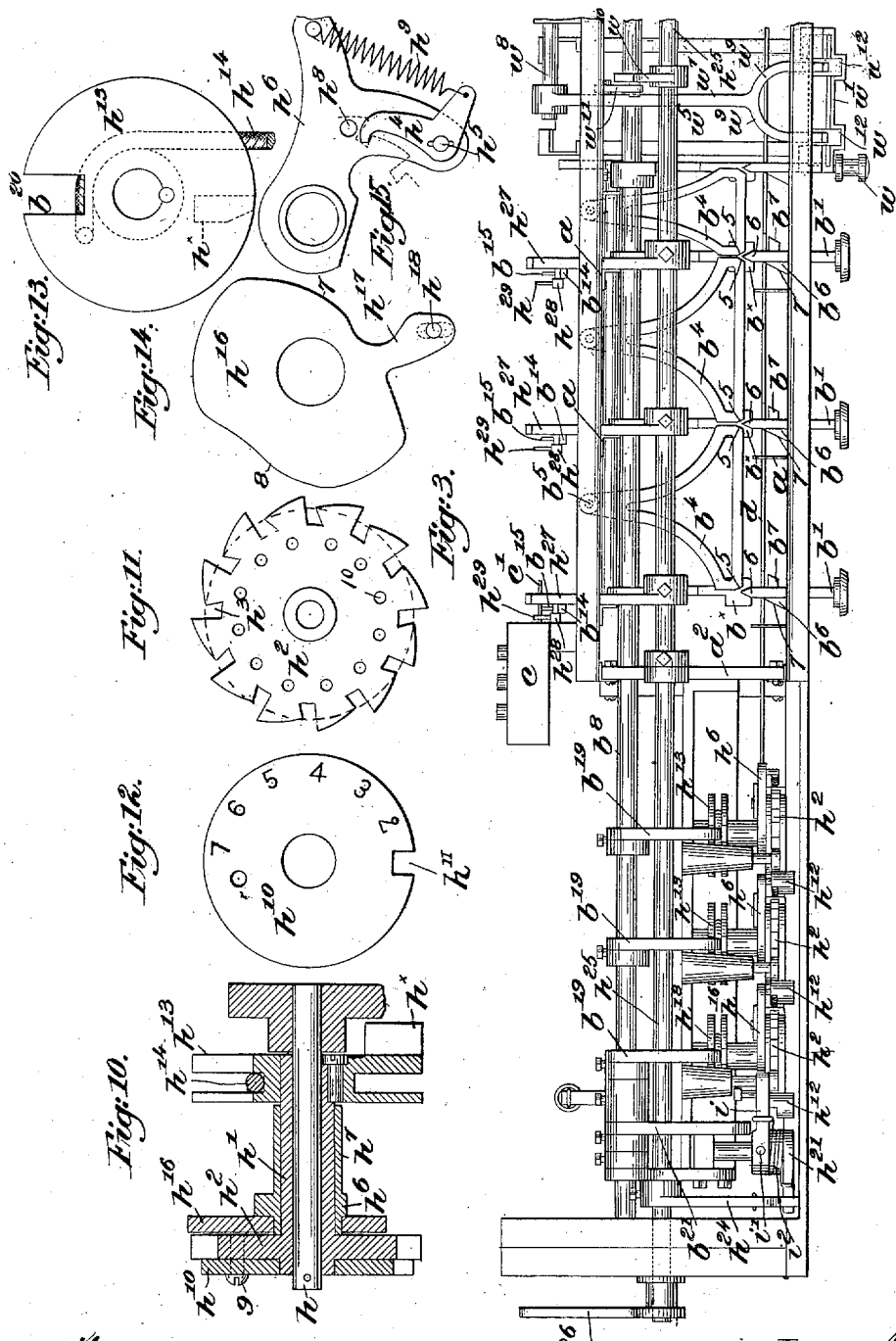
Witnesses.
Fred S. Greenleaf.
A C Harmon
Inventor
Albert Snoeck.
by Crosby & Gregory
Attys.

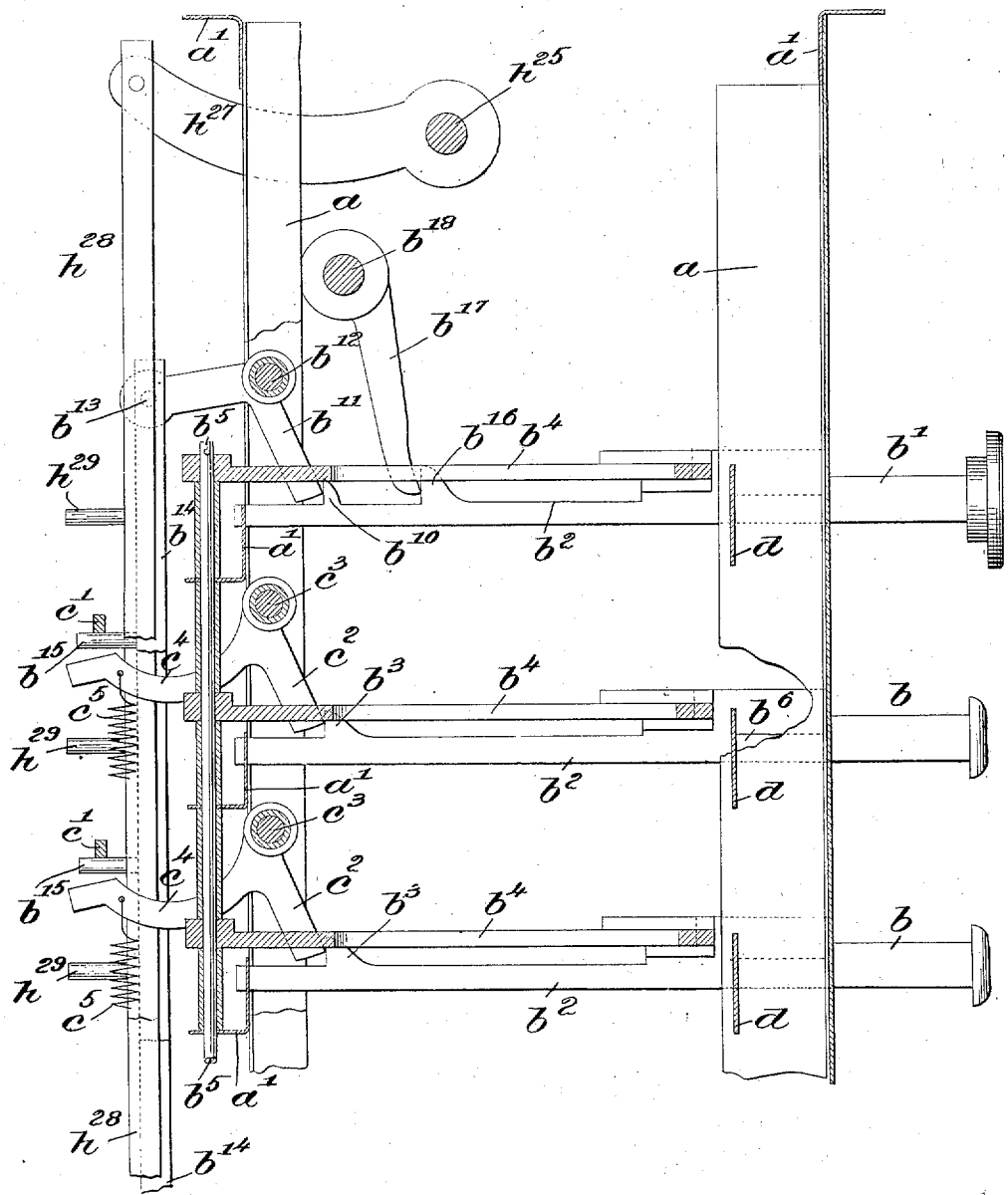

No. 608,923. Patented Aug. 9, 1898.
A. SNOECK.
VOTING MACHINE.
(Application filed Mar. 7, 1895.)
(No Model.) 13 Sheets—Sheet 5.
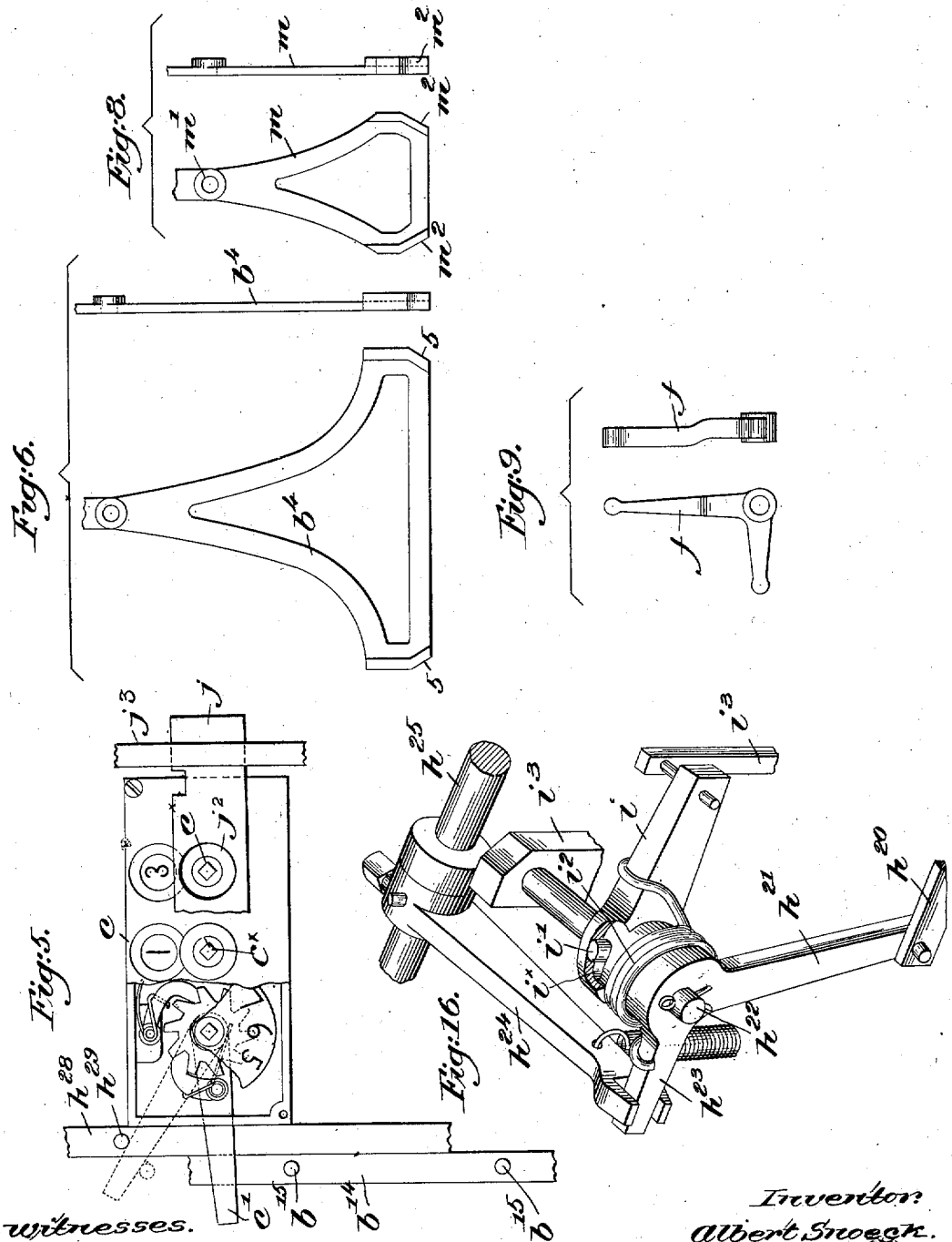
Witnesses.
Fred S. Greenleaf.
A.C. Harmon
Inventor:
Albert Snoeck.
By Crosby Gregory
Attys.

No. 608,923. Patented Aug. 9, 1898.
A. SNOECK.
VOTING MACHINE.
(Application filed Mar. 7, 1895.)
(No Model.) 13 Sheets—Sheet 6.
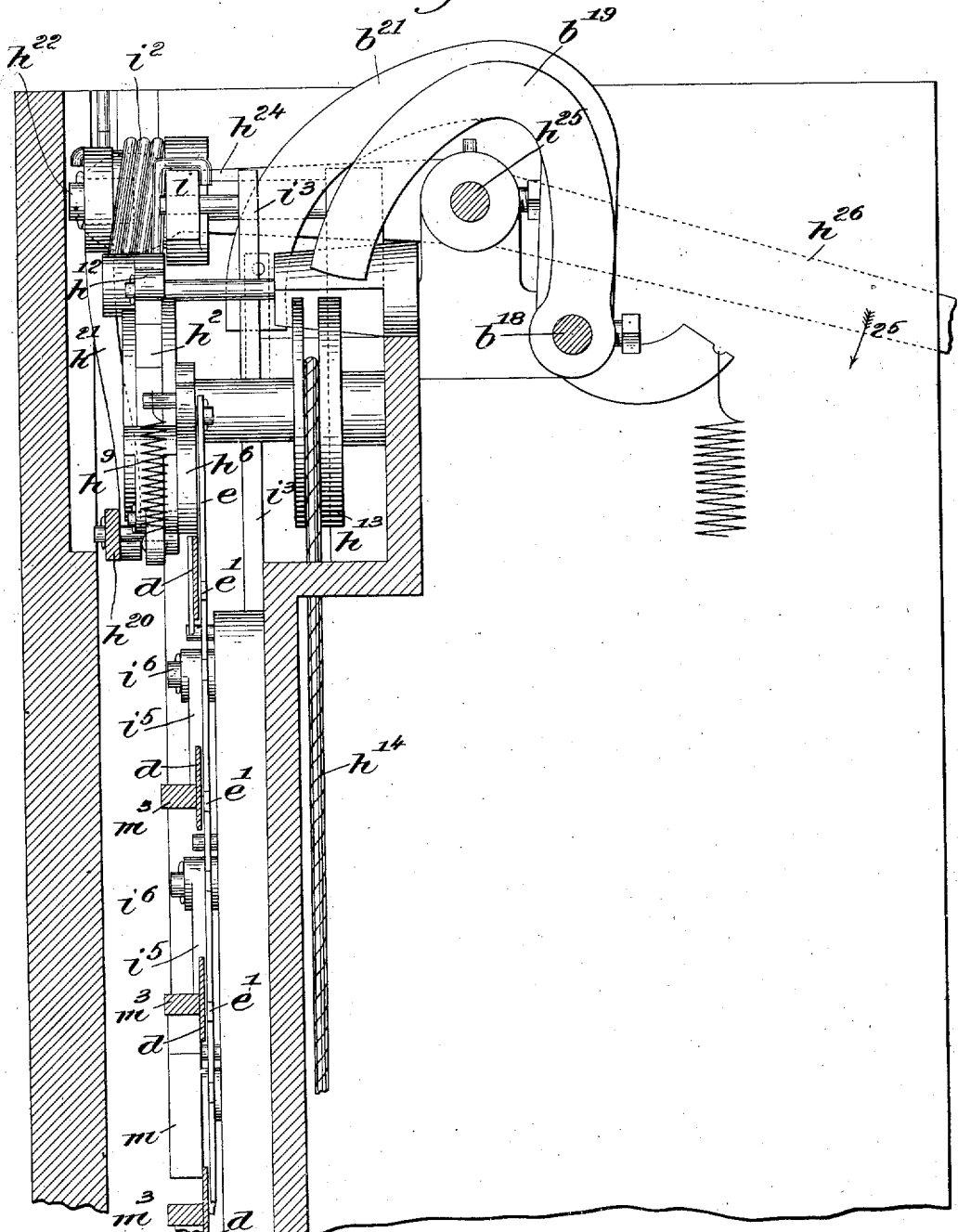
Witnesses.
A C Harmon
Fred S. Greenleaf
Inventor:
Albert Snoeck,
by Crosby & Gregory
Attys.

No. 608,923. Patented Aug. 9, 1898.
A. SNOECK.
VOTING MACHINE.
(Application filed Mar. 7, 1895.)
(No Model.) 13 Sheets—Sheet 7.
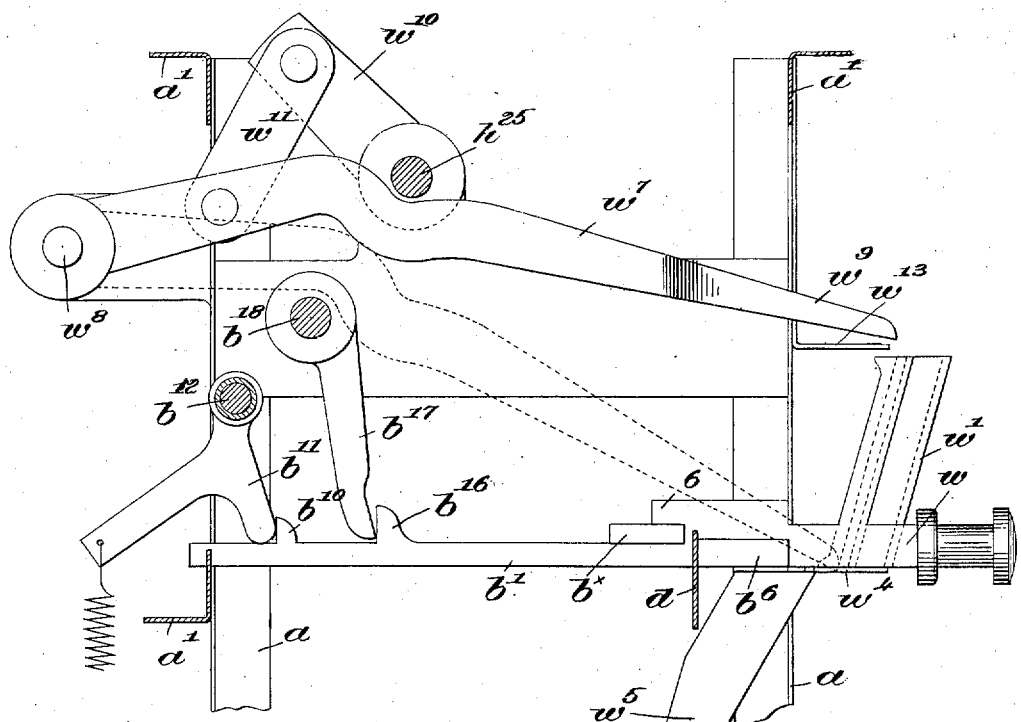
Fig. 17.
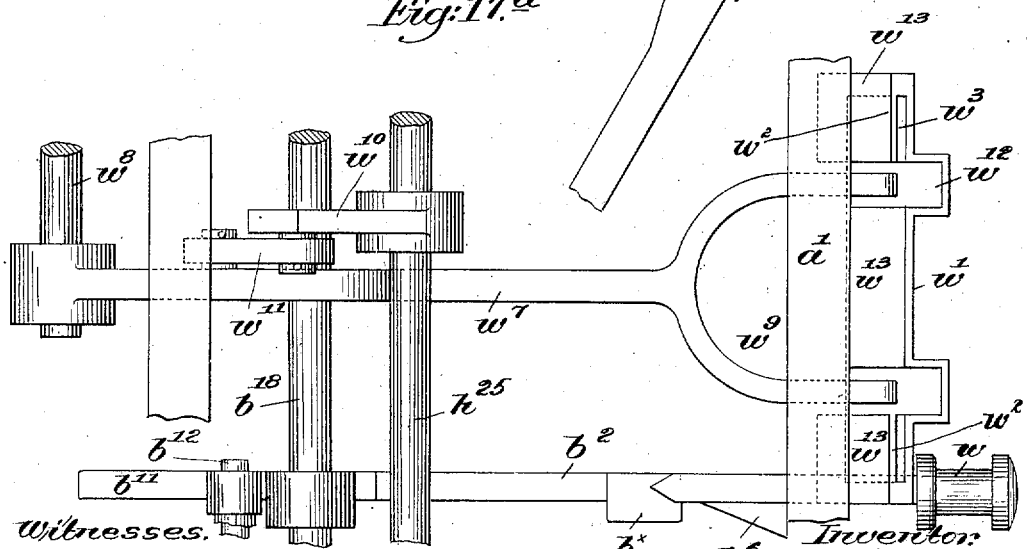
Fig. 17.ª
Witnesses.
A. C. Harmon.
Fred S. Greenleaf.
Inventor:
Albert Snoeck.
by Crosby Gregory
attys.

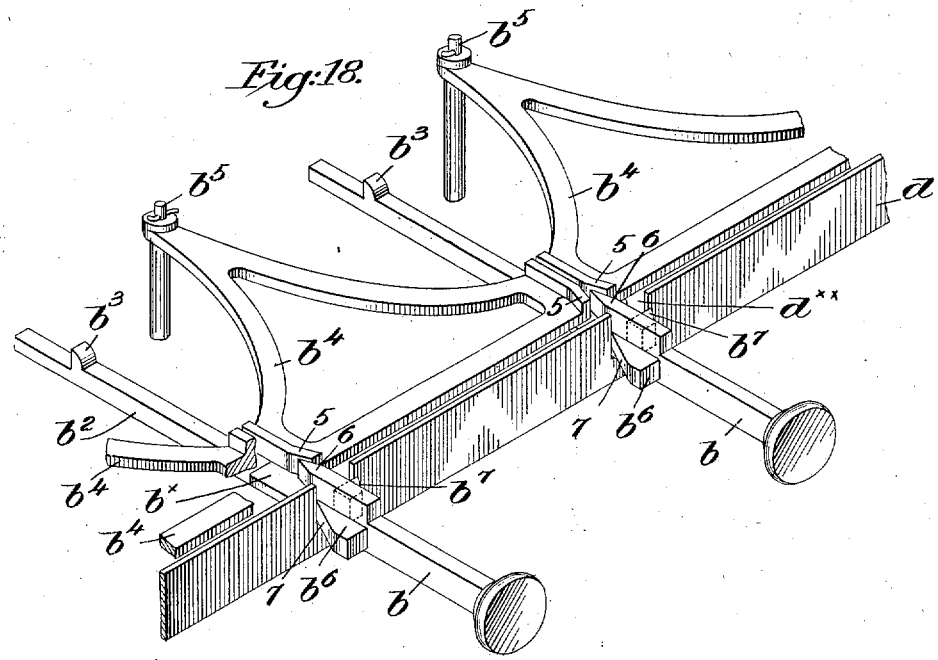
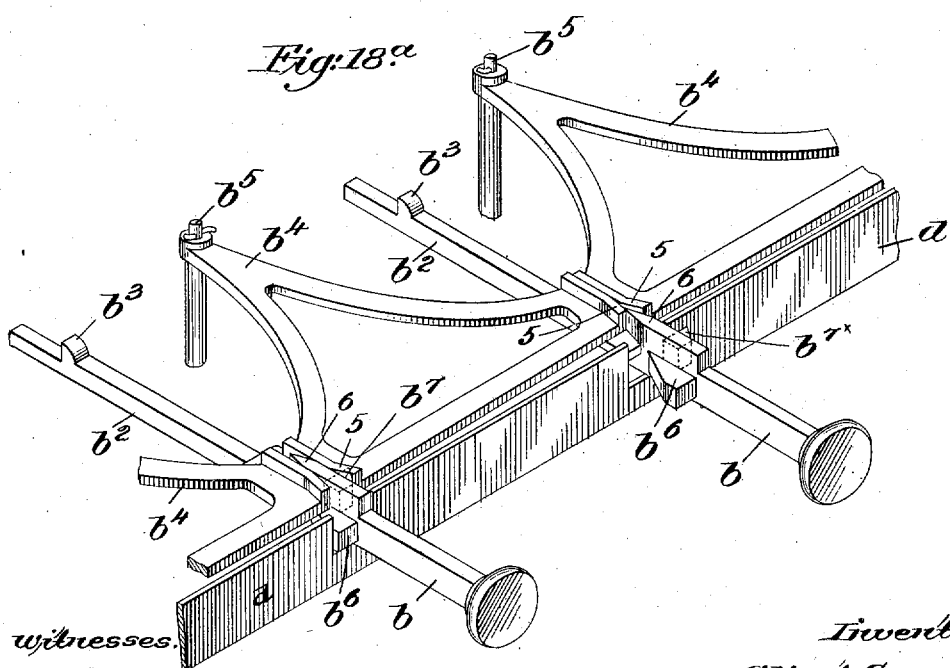

No. 608,923. Patented Aug. 9, 1898.
A. SNOECK.
VOTING MACHINE.
(Application filed Mar. 7, 1895.)
(No Model.) 13 Sheets—Sheet 9.
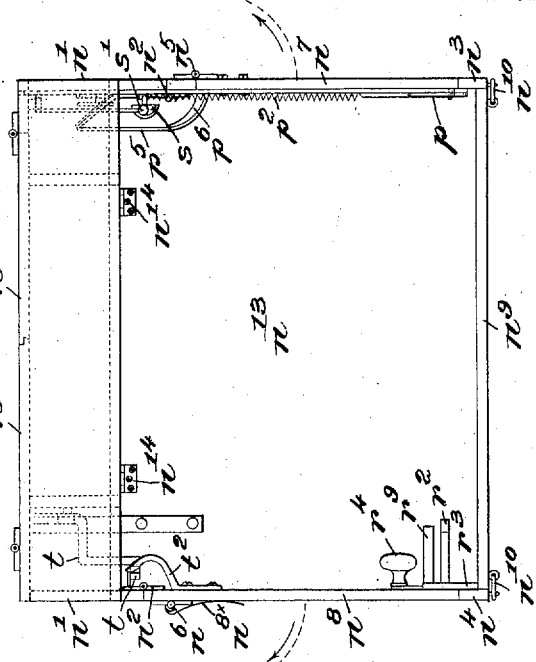
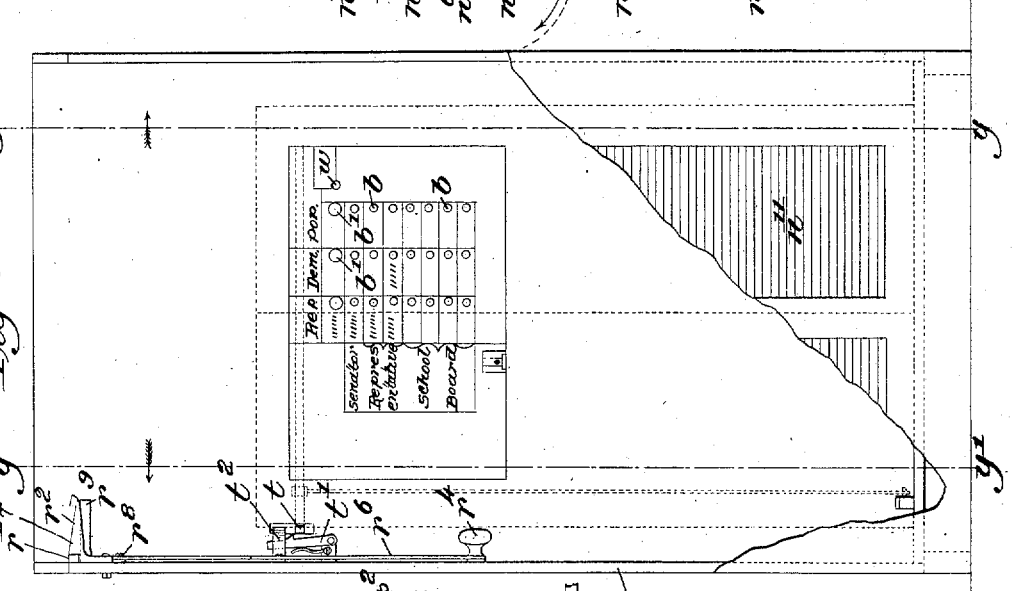
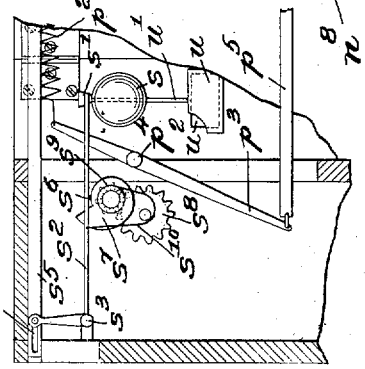
Witnesses.
Fred S. Greenleaf
Thomas J. Drummond
Inventor:
Albert Snoeck.
by Crosby Gregory
Attys.

No. 608,923. Patented Aug. 9, 1898.
A. SNOECK.
VOTING MACHINE.
(Application filed Mar. 7, 1895.)
(No Model.) 13 Sheets—Sheet 10.
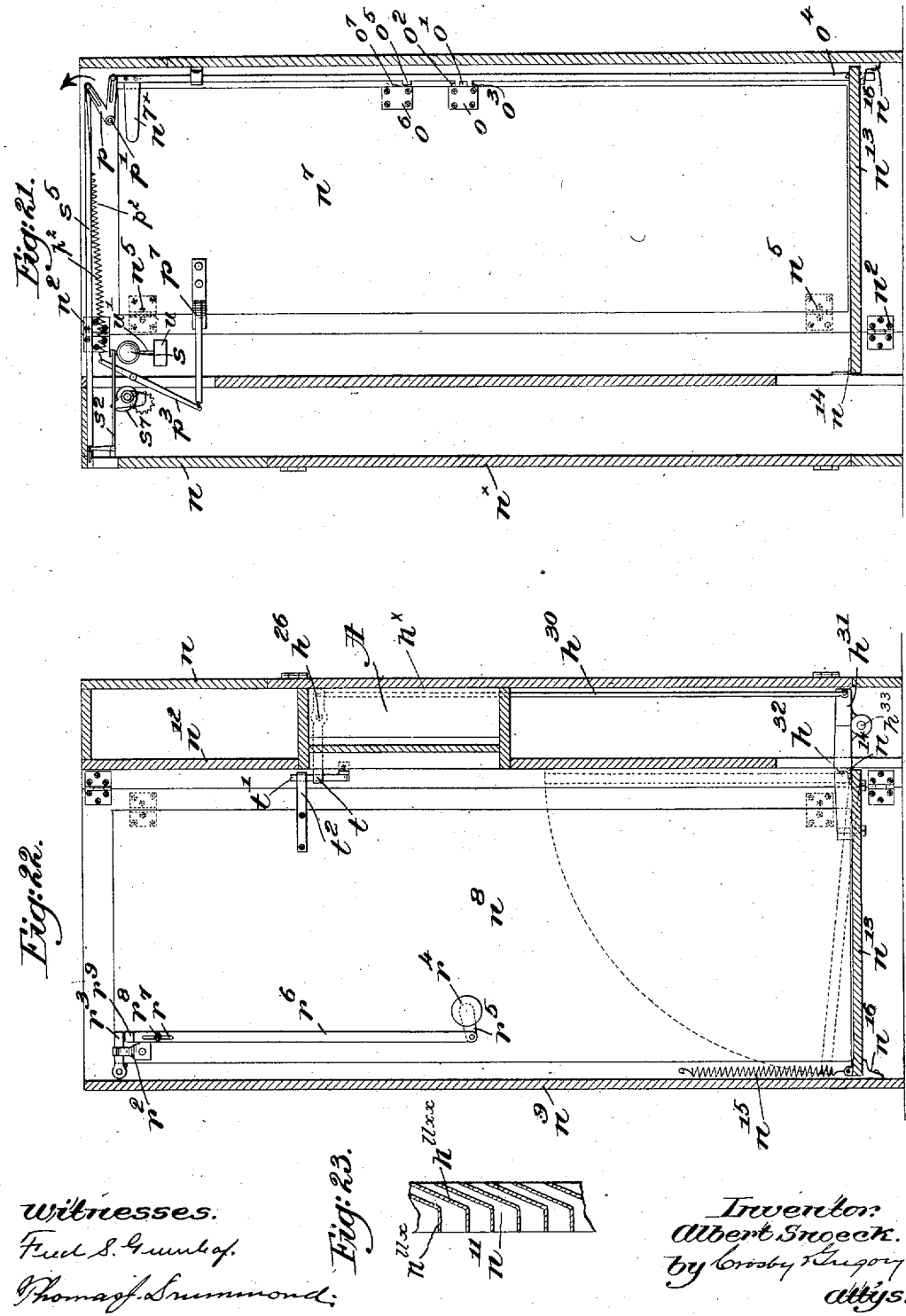
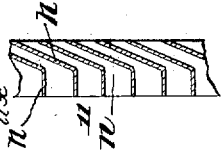
Witnesses.
Fred S. Greenleaf.
Thomas J. Drummond.
Inventor:
Albert Snoeck.
by Crosby & Gregory
Attys.
THE NORRIS PETERS CO., WASHINGTON, D. C.

No. 608,923.

A. SNOECK.
VOTING MACHINE.
(Application filed Mar. 7, 1895.)

Patented Aug. 9, 1898.

(No Model.)

13 Sheets—Sheet 11.

*Fig. 24.*

No. 608,923. Patented Aug. 9, 1898.
A. SNOECK.
VOTING MACHINE.
(Application filed Mar. 7, 1895.)
(No Model.) 13 Sheets—Sheet 12.
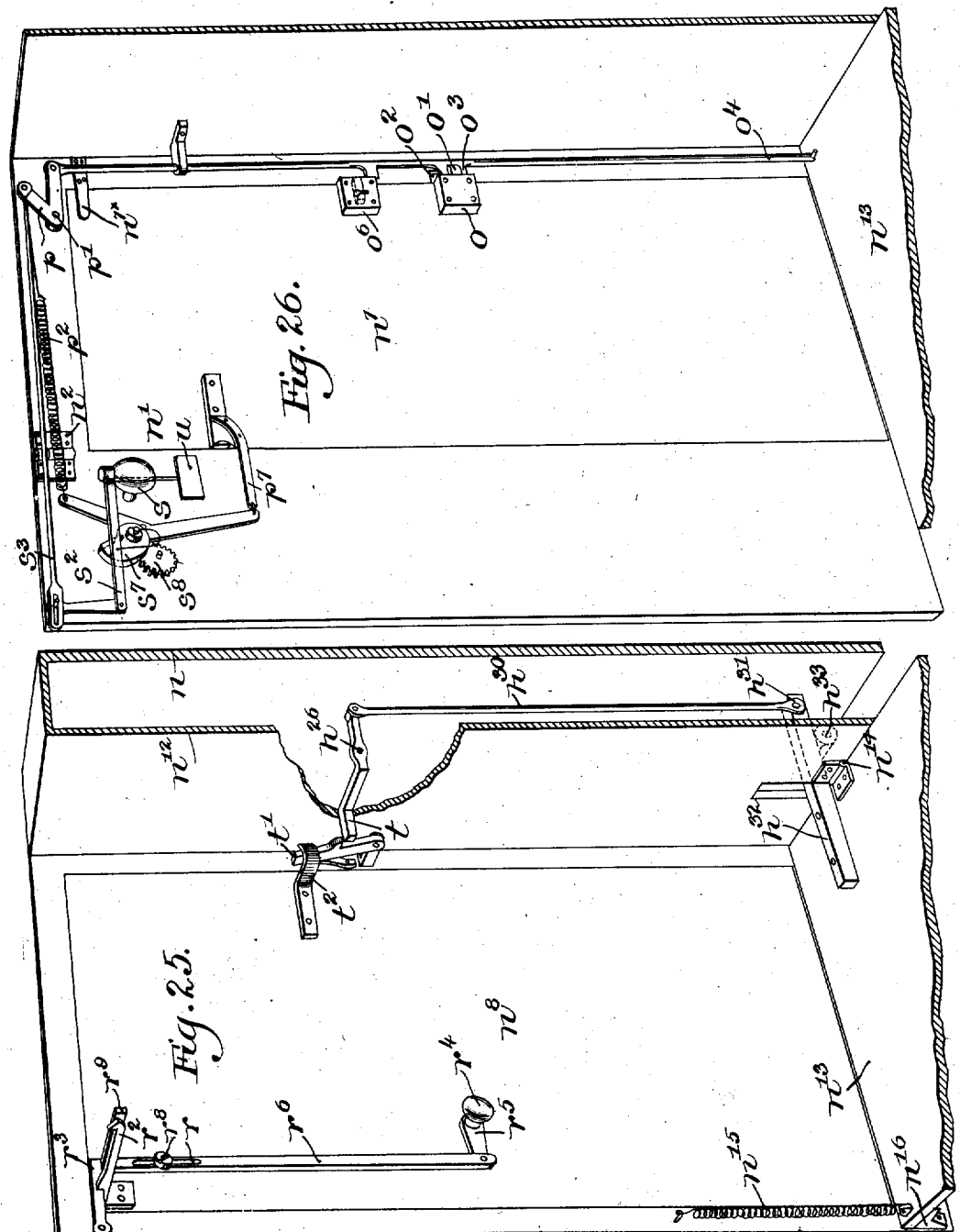
Witnesses
Louis N. Gowell.
Fred S. Greenleaf.
Inventor
Albert Snoeck,
by Crosby Gregory, Attys.

No. 608,923. Patented Aug. 9, 1898.
A. SNOECK.
VOTING MACHINE.
(Application filed Mar. 7, 1895.)

(No Model.) 13 Sheets—Sheet 13.

Witnesses.
Louis N Gurell
Fred S Greenleaf

Inventor.
Albert Snoeck.
by Crosby Gregory.
Attys

UNITED STATES PATENT OFFICE.

ALBERT SNOECK, OF HARTFORD, CONNECTICUT.

VOTING-MACHINE.

SPECIFICATION forming part of Letters Patent No. 608,923, dated August 9, 1898.

Application filed March 7, 1895. Serial No. 540,849. (No model.)

*To all whom it may concern:*

Be it known that I, ALBERT SNOECK, a subject of the King of Belgium, but at present residing at Hartford, in the county of Hartford, State of Connecticut, have invented an Improvement in Voting-Machines and Booths Therefor, of which the following description, in connection with the accompanying drawings, is a specification, like letters on the drawings representing like parts.

This invention relates to voting-machines of the class wherein a series of voting or registering keys are arranged adjacent the names of the various candidates for election, operation of any key actuating a suitable counter, which registers a vote for the candidate represented by the key operated.

One part of my invention has for its object to provide suitable locking or interlocking devices for preventing simultaneous operation of any of the keys in the same series and also of any keys in two or more different series coupled in the same group. For grouping different series of keys to permit the voter to select and operate any two or more of a large number of keys representing as many different candidates for the same office, I have provided one or more grouping devices, which may be set or adjusted so as to limit or fix the total number of keys to be operated by any single voter from the group connected with and controlled by it; and another part of my invention consists in providing suitable means whereby any series of keys may be coupled or connected with any one of the grouping devices to enable any two or more of the series to be brought into the same group.

My invention also comprehends a series of straight-ticket keys, which are operated independently of the other or individual-voting keys.

In voting-machines of this class the names of regularly-nominated candidates only are displayed adjacent and to be voted for by means of the individual-keys, and some provision must be made for what may be termed "irregular" or "independent" voting—*i. e.*, votes cast for persons whose names do not appear upon the face of the machine.

Heretofore in machines of this class irregular or independent voting has been provided for by means of receptacles or strips of paper, one for each officer to be elected, the voter being required to write the name of the individual for whom he wishes to cast his vote either upon a slip of paper or ballot which is deposited in the receptacle or upon the strip of paper corresponding to the office to be filled; but in cases where a plurality— say four officers—are to be elected to the same office—*e. g.*, four members to be elected for a school-board—each member or officer must have a separate receptacle or strip of paper, and it is possible for a voter to write the same name upon all four of the slips, drop the same in the respective receptacles, or write the same name upon all four of the strips of paper, and thus cast four votes for the same individual for the office of school-board. To obviate this possibility for repeating, my invention comprehends a single receptacle only for all independent or irregular votes, the same to receive a single ballot, upon which the names of all the individuals voted for and for whatever office are written. In such a case to repeat would require the same name to appear two or more times on the same ballot, which would be readily detected when the ballots are counted, and such a ballot would be at once cast aside. This single independent-voting device is interlocked in suitable manner with the other keys of the machine to prevent its operation after operation of any of the other keys and to prevent operation of the other keys after it has been operated, it being further provided with suitable locking devices to prevent two or more successive operations by the same voter.

My invention also comprehends a suitable booth to contain the voting-machine, which with its accessories, together with other features of my invention, will be hereinafter described, and particularly set forth in the claims.

Figure 1 is a front elevation of a ballot-machine embodying my invention with the door swung back to expose a part of the working mechanism; Fig. 2, a rear side elevation of the machine shown in Fig. 1; Fig. 2ª, a detail to be described; Fig. 3, a top or plan view of the machine, Figs. 1 and 2; Fig. 4, a vertical partial section, on an enlarged scale, taken on the dotted lines $x\,x$, Figs. 1 and 2, the figure showing the parts looking to the right, Fig. 1, and to the left, Fig. 2; Fig. 5, a detail showing the counter partially broken away to expose the working parts, said figure also showing the straight-ticket-counter actuator and counter-resetting device; Fig. 6, a plan and edge view, respectively, of one of the interlocking devices between the voting-keys in the same series. Fig. 7 is a section, on an enlarged scale, taken on the dotted line $x'\,x'$, Fig. 1, looking to the left; Fig. 8, face and edge views, respectively, of one of the interlocking devices between two series of voting-keys; Fig. 9, face and edge views, respectively, of one of the connections between a sliding member and one of the grouping members; Fig. 10, a vertical sectional detail through one of the grouping devices; Figs. 11 to 15, inclusive, details of parts of the grouping devices; Fig. 16, a perspective detail to be referred to; Fig. 17, a partial section, on an enlarged scale, taken on the dotted line $x^2\,x^2$, Fig. 2, looking to the left, the section being also on the dotted line $x^2\,x^2$, Fig. 1, looking to the right, showing parts of the irregular-voting device; Fig. 17$^a$, a top or plan view of a part of the irregular-voting device; Figs. 18 and 18$^a$, perspective details showing one arrangement of interlocking device between adjacent keys in the same horizontal series; Fig. 19, a plan view of a booth embodying my invention; Fig. 20, a front view of the same with a part of the front broken away to expose the voting-machine and parts of the booth within; Fig. 21, a vertical section on the dotted line $y\,y$, Fig. 20, looking to the right; Fig. 21$^a$, a detail showing the alarm and indicator parts on an enlarged scale; Fig. 22, a vertical section on the dotted line $y'\,y'$, Fig. 20, looking to the left; Fig. 23, a sectional detail showing the preferred construction of reflecting-slats for the booth; Fig. 24, an enlarged perspective detail showing the independent-voting device with the card in position and its holder pushed inwardly, covering the upper edge of the card and preventing its withdrawal, the figure showing the parts in the positions in which they appear just before the pressure of the ejector $w^7$ to eject the card from the holder; Fig. 25, a perspective view of the parts shown in Fig. 22, and Fig. 26 a perspective view of the parts shown in Fig. 21, so far as it has been possible to show the several parts in these perspectives. Fig. 27 is a perspective view of Fig. 10.

In the particular machine selected to illustrate my invention, and therefore shown in the drawings, the front and back frames, of suitable shape and construction to sustain the working parts, are shown as consisting each of a series of upright members $a\,a$, connected at proper intervals by the horizontal members $a'\,a'$, the two frames being shown as joined by suitable cross members $a^2$. (See Fig. 3.)

Instead of the composite frame described I may employ frame-plates suitably formed or struck up from single strips of metal.

In the present embodiment of my invention I have shown the voting-keys as arranged in vertical and horizontal series, the top horizontal series $b'$ being what I term "straight-ticket" keys, to be hereinafter described, the other horizontal series $b$ being what I term "individual-voting" keys.

The individual-voting keys $b\,b$ are provided at their outer ends with suitable finger-tips and back of the same with suitable shanks $b^2$, (see Fig. 4,) extending from the front to the back frames of the machine and mounted to slide in suitable bearings in the horizontal members $a'$ of the said frames.

Secured to the vertical members $a$ of the back frame of the machine are the counters $c$, three of which are shown in Fig. 2, the others being removed to better show the parts back of the same, the said counters $c$ being of any suitable or desired construction adapted to register successive movements of their counter-actuators, herein shown at $c'$, each counter, as shown, having one or more resetting-arbors $c^\times$.

Each of the finger-keys (see Fig. 4) is provided near its inner end with a shoulder $b^3$, which, when the key is pressed inwardly, strikes against one arm $c^2$ of a bell-crank lever, pivoted at $c^3$ to one of the vertical standards of the back frame, causing its other arm $c^4$ to strike the counter-actuator from the under side (see Fig. 2) and raise the same to cause the said actuator to register one movement of the voting-key, there being one of these bell-crank levers $c^2\,c^4$ for each of the keys of the machine, so that when a key is pushed inwardly a vote is registered by its counter for the particular candidate represented by the key operated. The keys are returned again to their normal outer positions by suitable springs $c^5$, (see Fig. 4,) connecting the arms $c^4$ of the bell-crank levers with the frame, but the counter-actuators remain in their elevated positions until positively depressed.

Preferably the keys $b$ are arranged in both vertical and horizontal series, it being the usual custom to arrange in the same horizontal series names of the candidates of the different parties for the same office. Hence to prevent operation or pushing in of two or more of the keys in the same horizontal row, which would thereby enable a single voter to register votes for more than the one candidate for whom he is entitled to vote, I have provided suitable interlocking devices, (see Figs. 3, 6, and 18,) shown as triangular frames $b^4$, pivoted at their apices at $b^5$ to the horizontal members of the back frame and at their front ends, adjacent the front of the machine, resting at their tips upon suitable tables $b^\times$, formed on and as a part of the keys.

The corners of the interlocking frames $b^4$ are cut at an angle, as at 5, Fig. 3, and are adapted to be acted upon by the wedge-shaped or tapering projections 6 on the several keys, said projections constituting separators.

Each of the interlocking frames $b^4$, between its widest points, is of a width substantially equal to the distance from center to center between two adjacent keys in the same horizontal row, and, referring to Figs. 3 and 18, it will be seen that in the normal condition of the machine the points of the projections 6 on the keys enter slightly the V-shaped openings formed between the angular corners of two adjacent interlocking devices $b^4$, the points 6 projecting into the said openings to such a distance as will permit the interlocking devices at either side and forming half of the V-shaped openings to be moved toward them a distance equal to one-half the thickness of the projections 6.

The operation of the interlocking mechanism is as follows, viz: When any single key is pushed in, its pointed projection 6 will strike the angular corners of the interlocking devices forming the V-shaped opening in front of it and will separate the said interlocking devices, moving each a distance equal to one-half its width, which will thereby enable the said projection to pass through or between the said interlocking devices and actuate the counter, as described; but the projection 6 is of such a length that when a key is pushed to its innermost position the projection still stands between and holds separated the two interlocking devices between which it passed, (see Fig. $18^a$,) so that if it is attempted to push inwardly any of the other keys in the same horizontal series their pointed projections 6 upon striking the angular corners of their respective interlocking devices will find it impossible to move said interlocking devices on account of the projection 6 of the key first pushed holding the same against lateral movement.

Arranged at the back of the front frame of the machine and mounted in suitable bearings therein are a series of horizontal sliding plates or members $d$, which I term "interlocking" members, the same being notched or recessed, as at $d^\times$, to permit the key-shanks $b^2$ to be carried therethrough. (See Fig. 18.)

The key-shanks $b^2$ are provided at one of their sides with lugs $b^6$, having inclined front faces 7, and the notches $d^\times$ in the sliding interlocking members $d$, through which the keys pass, are of a width substantially equal to the combined width of a key-shank and the lug $b^6$ at its widest point.

The keys $b$ at their sides opposite the incline-faced lugs $b^6$ are shown as provided with other square-faced stop-lugs $b^7$, projecting at one side to nearly the same distance as the incline-faced lugs $b^6$.

In the normal condition of the machine the sliding interlocking members $d$ are in their extreme right-hand positions, Fig. 18, the left walls of the notches $d^\times$ then contacting with the shanks of the several keys. When in such position, the stop-lugs $b^7$ stand immediately in front of the said sliding members $d$. If now one of the keys $b$ be pushed inwardly, its incline-faced lug $b^6$ will act upon the left wall of its notch in the sliding interlocking member and move the latter to the left, (see Figs. 1 and $18^a$,) in order that the said lug may pass through the notch during the inward pushing of the key, such sliding of the interlocking member $d$ to the left bringing the right walls of the several notches against the right faces of the several keys, and, with the exception of the key operated, the said right walls of the notches when moved against the keys are moved directly in front of the stop-lugs $b^7$ of the remaining keys of the series, thereby preventing the said remaining keys being pushed inwardly, for the reason that when pushed their stop-lugs will strike the sliding members $d$, which will prevent further movement. The key operated or pushed inwardly is likewise locked against return movement by its stop-lug $b^7$ at the opposite or inner side of the sliding interlocking member $d$, so that until the said interlocking member $d$ has been positively returned to its normal position at the right the key operated cannot be returned to its normal position, nor can any of the remaining keys of the series be pushed inwardly. When the sliding member $d$ has been returned to the right, the operated key may be returned by its spring to its normal position and the remaining keys of the series may any of them be operated as desired, but in any case not more than one at a time.

Referring now to Figs. 1 and 3, the sliding interlocking members $d$ at their left ends are suitably supported and made to slide in the extreme end standard of the frame, and arranged back of the said interlocking members $d$ and adapted to move in lines at right angles thereto—viz., in vertical lines—I have herein shown three what I shall term "grouping members" $e\ e$, the same having suitable bearings in the frame at their lower ends and at their upper ends pivoted to the group-actuator arms, to be described.

Each of the sliding interlocking members $d$ is provided with a notch $d^\times$ for and adjacent each of the vertical grouping members crossing the same, and each of the vertical grouping members is provided adjacent each of the sliding interlocking members $d$ with a shoulder $e'$, and I have provided suitable grouping connections $f$, shown as bell-crank levers, adapted to be pivoted upon the pivot-pins $f'$ (of which there is one for each notch in each of the sliding interlocking members) and with one of their arms entering the notches in the interlocking members and their other arms arranged beneath the shoulders $e'$ of the grouping members, whereby any interlocking member $d$ may be connected with any vertically-moving grouping member $e$. For example, referring to Fig. 1, the third and fourth interlocking members from the top are shown as connected by the grouping connections $f$ with the first or right-hand vertically-movable grouping member, and the last four interlocking members $d$ are shown as connected by the grouping connections $f$ with the second or middle vertically-movable grouping member $e$, and by removing or inserting the several grouping connections $f$ where needed it is evident that any sliding interlocking member $d$ may be connected with any vertically-movable grouping member $e$, for a purpose to be hereinafter described.

Referring now to Figs. 1, 3, and 7 and to the detail Figs. 10 to 15, inclusive, H H are what I shall term the "grouping devices," and as they are similar in construction I will describe in detail but one only.

Referring particularly to Figs. 7 and 10 to 15, $h$ is a pin projecting forward from the frame and having journaled upon it a sleeve $h'$, carrying at its front end a notched wheel $h^2$, (see Fig. 11,) the said notched wheel being in effect an ordinary ratchet-wheel with a pocket $h^3$ at the bottom of each notch, below the dotted lines represented in Fig. 11. Coöperating with this ratchet-wheel $h^2$ is a pawl $h^4$, (see Figs. 1 and 15,) pivoted at $h^5$ to a group-actuator $h^6$, said group-actuator having its sleeve or hub $h^7$ surrounding and having its bearings upon the sleeve $h'$ of the toothed wheel $h^2$, the said group-actuator $h^6$ having jointed to it at $h^8$ the upper end of its grouping member $e$ described. A spring $h^9$ connects the pawl $h^4$ with an arm of the actuator and serves to retain the pawl always in operative engagement with the teeth of its ratchet-wheel $h^2$. At the front side of the ratchet-wheel $h^2$ I have arranged a disk $h^{10}$ of a diameter substantially that of the dotted lines, Fig. 11, to overlap and cover the pockets $h^3$, the pawl $h^4$ being of sufficient width to lap over upon the periphery of this disk, and with the periphery of the disk intact—that is, unbroken—the ratchet-wheel $h^2$ will serve simply as an ordinary ratchet-wheel. At one point of its circumference the disk $h^{10}$ is provided with a notch or pocket $h^{11}$, adapted to register with one of the pockets $h^3$ of the ratchet-wheel, so that when the pawl during rotation with the ratchet-wheel and its disk $h^{10}$ reaches the pocket $h^{11}$ in the disk it will drop into the said pocket and also into the pocket $h^3$ of the ratchet-wheel, the shape of the engaging end of the pawl being such that when it drops into one of the pockets $h^3$ it will remain therein until positively removed by the resetting device, to be described, retrograde movement of the ratchet-wheel being prevented by a usual stop or retaining pawl $h^{12}$. (Shown in Fig. 1.) Upon the inner end of the sleeve $h'$ of the ratchet-wheel is made fast a grooved pulley $h^{13}$, in the groove of which is wound and made fast one end of a cord $h^{14}$, suspending at the back of the machine a weight $h^{15}$, (see Fig. 2,) or instead of the weight I may employ its well-known equivalent—a spring—the action of the weight or its equivalent being to rotate the ratchet-wheel $h^2$ in a direction opposite that in which it is moved by the group-actuator. To disengage the pawls from the ratchet-wheel $h^2$ to permit the said ratchet-wheel to be returned to its normal position by its weight $h^{15}$, I have provided a cam-plate $h^{16}$, loosely mounted upon the sleeve or hub $h^7$ of the group-actuator and provided with two cam-surfaces 7 and 8, adapted when rotated to act respectively upon the pawls $h^4$ and $h^{12}$ and to move the said pawls out of engagement with the teeth of the ratchet-wheel, the said cam-plate $h^{16}$ having an arm $h^{17}$, provided with a pin $h^{18}$, entering a slot $h^{19}$ in a horizontal connecting-rod $h^{20}$, to which all of the cam-plates $h^{16}$ of the several grouping devices are connected, the said connecting-rod $h^{20}$, at its left end, being herein shown as jointed to one end of a bell-crank lever $h^{21}$, pivoted upon a stud $h^{22}$, having its arm $h^{23}$ acted upon by the forked end of an arm $h^{24}$, fast on the resetting-shaft $h^{25}$, journaled in suitable bearings on the frame and provided with a resetting-arm $h^{26}$. (Shown in dotted lines, Fig. 7, and in full lines, Figs. 2 and 3.)

Referring to Figs. 1, 3, and 16, I have loosely mounted upon the hub of the bell-crank lever $h^{21}$ an arm $i$, which is provided, as herein shown, with a pin $i'$, which enters a groove or slot $i^x$ in the hub of the said bell-crank lever. While the slot (see Fig. 16) is of such a length as to permit a yielding relative movement of the arm $i$ to the bell-crank lever $h^{21}$, yet full movement of the lever cannot take place without also moving the arm $i$, a spring $i^2$ connecting the arm and bell-crank lever and serving to hold the same normally in position with the pin $i'$ at the end of the slot. (Shown in said Fig. 16.) To the free end of the arm $i$ is jointed a vertical sliding returning-rod $i^3$, which passes down back of the several horizontal sliding interlocking members $d$ and is provided just above each of the several interlocking members $d$ with pins $i^4$. (See Fig. 1.) Between the pins $i^4$ and their respective interlocking members $d$ and adapted to be actuated by the pins are arranged the bell-crank levers $i^5$, pivoted upon pins $i^6$ on the frame and having one of their arms standing just below the pins $i^4$ and their other arms entering notches $i^7$ in the interlocking members $d$, so that when the said returning-rod $i^3$ is depressed its several pins will act through the bell-crank levers $i^5$ to move all those interlocking members $d$ which are in their abnormal positions at the left to the right again into their normal positions, as will be hereinafter described.

To enable the operation of my improved machine to be understood, reference may be had to Fig. 20, showing the machine in its position in a voting-booth.

Each of the vertical rows of keys is supposed to receive the names of all the candidates regularly nominated by one party. Accordingly the three vertical rows are denominated by the abbreviations "Rep.," "Dem.,"

and "Pop.," denominating the Republican, Democratic, and Populist parties, or any other party may be substituted, if desired. At the left of the keys are shown the words "Senator," "Representative," and "School Board," it being supposed that one member is to be elected for the office of senator, and accordingly the word "Senator" is placed against one horizontal row or series of keys to thereby permit the one candidate nominated by either party to be voted for. Two representatives are supposed to be elected. Therefore two rows are included under the heading "Representative" to thereby permit two candidates of either party to be voted for to fill this office, and under the heading "School Board" are included four horizontal rows or series of keys to enable four candidates on each ticket—that is, in each vertical row—to be voted for.

Referring now to Figs. 1 to 4, a voter wishing to cast his vote for one of the candidates for senator presses that particular key in the horizontal series against the word "Senator," which is against the name of the individual for whom he wishes to cast his vote, and when he presses in the said key the counter for that key at the back of the machine registers one vote for the candidate represented by the key, and at the same time the interlocking member $d$ for that series of keys is moved to the left, locking that key in its inmost position and, as described, locking all the other keys in the same or "Senator" series against operation, so that it is impossible for him to afterward press any of the remaining keys or cast other votes for other candidates for the same office. To vote for two candidates for the office of representative, the voter will press those two keys in the two rows adjacent the word "Representative" which are against the names of the candidates for whom he wishes to vote. To give to the voter the privilege of voting for any of the six names arranged adjacent the word "Representative," it must be possible for him to press one key only in the first row and one key only in the second row, or two keys in either of the rows, and at the same time lock all the other keys against operation.

Referring now to Fig. 1, I have connected the two sliding interlocking members $d$ for the two rows of keys adjacent the word "Representative" by the grouping connections $f$ with the first vertically-movable grouping member $e$, connected with and operating the first of the grouping devices H. I then, by means of a suitable device shown as a screw $g$, turn the disk $h^{10}$ of that grouping device on and with relation to the ratchet-wheel $h^2$ thereon into such position that the pocket $h^{11}$ of the disk shall register with the pocket $h^3$ of the second tooth of the ratchet-wheel to be engaged by the pawl of the group-actuator, the operation of the mechanism then being as follows, viz: Assuming that the voter wishes to vote for two candidates whose names are in the same or first horizontal series, he will press one of the keys and register his vote for the candidate represented by that key in the counter, such movement of the key throwing the interlocking member $d$ to the left and causing it, through the group connection $f$, to raise the grouping member $e$ and causing the pawl $h^4$ on the group-actuator connected therewith to push the ratchet-wheel $h^2$ one notch in the direction of the arrow thereon, Fig. 1. As soon as the operator releases his key the spring $c^5$ described acts to return the same to its normal position, and as soon as the key commences its return movement the weight of the grouping member $e$, with its attached parts, causes the said member to drop, and, through the grouping connection $f$, returns the interlocking member $d$ also to its normal position, so that it does not prevent full return movement of the key operated, and when so returned will also permit subsequent movement of either of the keys in the same horizontal row. The voter has now cast one of the two votes allotted to him for representative. To register his second vote for any candidate whose name is in the same horizontal series, he will press the key against the candidate's name and cause the counter for that key to register a vote for the candidate, such movement of the key throwing the interlocking member $d$ again to the left as before, causing it, through its grouping connection $f$, to again raise the grouping member $e$ and cause the pawl $h^4$ to rotate the ratchet-wheel $h^2$ a second tooth in the same direction as before; but when the pawl engages this second tooth, the pocket of which registered with the pocket of the disk $h^{10}$ at the face of the wheel, the end of said pawl drops into the bottom of the said pocket in the ratchet-wheel, so that having moved the ratchet-wheel a distance represented by this second tooth the pawl remains suspended in the pocket of the tooth in its elevated position, thereby holding the operating member in its elevated position and preventing a return movement of the interlocking member, which thereby prohibits further operation of the keys in the same horizontal series for further voting, the voter having cast the two votes allotted to him for representative.

Should the voter upon release of the first key attempt to cast his second vote for the same candidate, he will operate the same key a second time and will move the interlocking device to the left, as described, and move the ratchet-wheel a second tooth, where it will be left to prevent further voting for this office, and he will thereby have used up his two opportunities for voting for this office, but will have registered only his first vote, for the counter-actuator, having been once moved to register a vote for a candidate, remains, as described, in its elevated position to prevent a second vote being registered for the same candidate until the entire mechanism has been returned to its normal position by movement of the resetting device, to be described. The voter having registered his two votes for candidates whose names appear in the first horizontal series of keys, to prevent his subsequent registering additional votes for candidates whose names appear in the second horizontal series included within the heading "Representative" I have provided an interlocking device between the two horizontal series, the same consisting, as herein shown, of a V-shaped interlocking device $m$, (see Figs. 1 and 8,) pivoted at $m'$ and having two angular or beveled corners $m^2$, adapted to be acted upon by the beveled or pointed ends of the projections or separators $m^3$ of the respective interlocking members $d$ for those two series of keys.

Referring to Fig. 1, when the voter presses the key of the top series to register his first vote for representative the projection $m^3$ on the interlocking member for that series is moved to the left over the interlocking device $m$, but is by return movement of the interlocking member again moved to the right of and to clear the said interlocking device $m$. Upon operation of the second key in the top series after the registering of his second and last vote for representative the said projection $m^3$ is by movement of the interlocking member $d$ again moved into position over the interlocking device $m$; but this time it is not returned, because the interlocking member $d$ was not returned, and with the projection $m^3$ in position over the interlocking device $m$ it is thereafter impossible to operate any of the keys of the second horizontal series, because of the impossibility of moving the interlocking member $d$ of that series to the left, its projection $m^3$ being in front of the interlocking device $m$, which cannot be raised, and therefore prevents sliding movement of the said member $d$.

Should the voter wish to register his second vote for a candidate whose name appears on the second horizontal series of keys, he will operate the desired key, registering his vote in the counter for that key, and by movement of the key throw the interlocking member $d$ of that series to the left, causing its grouping connection $f$ to lift the grouping member $e$ and move the ratchet-wheel as previously described, and at the same time its projection $m^3$, by reason of its inclined face and the inclined face of the interlocking device $m$, raises and passes beneath the latter, and as this second movement of the grouping member $e$ leaves it in its elevated position suspended in the pocket of the ratchet-wheel, as before described, the interlocking member of the second series operated will not return to its normal position, and therefore the projection $m^3$ of the member remains in position beneath and supporting the interlocking device $m$ and prevents a subsequent movement of a key in the first series should the voter try to register a third vote. It will thus be seen that in voting for two representatives the voter is prevented from pushing two keys simultaneously by the interlocking device $b^4$ at the back of the machine, previously described; but he is, however, permitted to successively push two keys in the first horizontal series or two keys in the second horizontal series, or one key in each series, and having pushed in succession two keys all the keys of the entire series are thereafter locked, as described.

Referring now to Fig. 20, the last four horizontal series of keys are grouped under the heading "School Board," to entitle each voter to vote for four candidates in either of the parties for the office of school-board. I have accordingly connected the horizontal sliding interlocking members $d$ of the last four horizontal series of keys by grouping connections $f$, similar to the grouping connections previously described, with a second vertically-movable grouping member $e$, and therefore with the second grouping device II, and I have also interlocked the last four interlocking members $d$ by means of three interlocking devices $m$, similar to that previously described. The disk $h^{10}$ of the second grouping device II is therefore so set relatively to its ratchet-wheel $h^3$ as to give four notches of movement to the wheel before its pawl drops into the pocket, the several disks being numbered, as shown, to enable them to be readily adjusted with relation to their respective ratchet-wheels. Supposing, therefore, that the voter wishes to cast his four votes for the four candidates of the school-board whose names appear in the same vertical row, he will first press the key against the desired candidate's name in the first row—that is, the fourth row from the bottom—and will register his vote by means of the counter for that candidate and by movement of the key throw the interlocking member $d$ of the series to the left, causing it, through its connection $f$, to raise the second grouping member $e$ and, through the pawl connected therewith, rotate the ratchet $h^2$ one tooth, and upon release the key is returned to its normal position, and the grouping member $e$, by its weight, as previously described, at once returns the interlocking member $d$ again to the right into its normal position. The voter now presses the key in the second series—that is, the third from the bottom—to register his second vote by means of its counter for the desired candidate, and by such movement of the key throws the interlocking member of the said second series to the left, and, through its grouping connection, a second time raises the grouping member $e$ and moves the ratchet-wheel $h^2$ a second tooth, the parts being returned to their normal position, as described. To register his third vote for the candidate of the third series—that is, the second from the bottom—he presses the desired key and registers his vote by means of the counter for that key and throws the interlocking member of that series to the left and raises the second grouping member $e$ and moves the ratchet-wheel a third tooth, the parts being again returned to their normal position upon release of the key. To register his fourth and last vote for the office of school-board, he presses a key in the fourth or last (bottom) series, registers his vote for the desired candidate, and throws the interlocking member of the last series to the left, and, through its grouping connections $f$, a fourth time raises the grouping member $e$ and moves the ratchet-wheel a fourth tooth or notch forward, and this time the pawl drops into the pocket in the ratchet-wheel at the fourth notch and holds the second grouping member $e$ in its elevated position, which prevents the return of the interlocking member $d$ to its normal position. When the interlocking member $d$ of the last series is moved to register the fourth vote, its projection $m^3$ is moved beneath and raises the lowermost interlocking device $m$, together with the two interlocking devices resting upon it, into their elevated positions, and as the said interlocking member $d$ is not returned again to its normal position the said interlocking devices $m$ are thereafter held in their elevated positions, preventing, by the projections $m^3$ of the several interlocking members, subsequent movement of any of the keys in the four series.

Simultaneous operation of any two keys in the same horizontal series of the last four series is prevented by the interlocking devices $b^4$ at the back of the machine, previously described, and simultaneous movement of two or more keys in different series is also prevented by the interlocking devices $m$, for when it is attempted to operate two keys in two different series they each try to move the interlocking devices $m$ such distance as to permit their lugs to pass, and as they must act upon said intermediate devices in opposite directions the said devices will receive no movement and will prevent either of the keys being operated. The interlocking devices $m$ are shown as provided with counterbalance-weights $m^{xx}$ to balance them and enable them to be easily operated. The voter is thus enabled to successively vote for four candidates whose names appear on the same horizontal series, or for four whose names appear in different horizontal series, or for two or more in either one of the horizontal series, and the rest in any other of the horizontal series, the other keys being, after the four votes have been cast, permanently locked to prevent a fifth or more votes being cast. The voter having cast all of the votes allotted to him now leaves the machine and the latter is reset—that is, returned to its normal condition throughout—in readiness for a second voter by means of the resetting-arm $h^{26}$, which when depressed in the direction of the arrow 25, Fig. 7, rotates the resetting-shaft $h^{25}$ and causes the forked arm $h^{24}$ on the said shaft to turn the bell-crank lever $h^{23}$ about its pivot and, through the connecting-rod $h^{20}$ and the cam-plate $h^{16}$, operated thereby, disengage all the pawls of the several grouping devices H, and simultaneously therewith, through the arm $i$, depress the returning-rod $i^3$, and through its pins $i^4$ and bell-crank levers $i^5$ push all the interlocking members $d$ to the right into their normal positions, permitting the grouping members $e$ to also drop to their normal positions, the ratchet-wheels $h^2$ and disks carried thereby being, upon release of the pawls, also returned to their normal positions by the weight $h^{15}$ described.

To insure the correct return movement of the several ratchet-wheels of the grouping devices, I have provided the pulleys $h^{33}$ thereof with side lugs $h^x$, which when the wheels have reached their normal or starting positions contact with suitable stops on the frame.

The resetting-shaft $h^{25}$ is provided with a series of arms $h^{27}$, one for and arranged above each vertical series of counters at the back of the machine, and jointed to each of these arms is a depending rod $h^{28}$, which is provided with a series of pins $h^{29}$, one for and arranged above each of the counter-actuating arms $c'$. When the counters are operated by movement of the keys, raising the counter-actuating arms $c'$, the said arms remain in their elevated positions, so that a second movement of the key cannot register a second vote for the same candidate until the machine has been reset, but when the resetting-shaft is moved to return the machine to its normal condition throughout the arms $h^{27}$ are moved to depress the rods $h^{28}$ and, through their pins $h^{29}$, depress or return the actuators $c'$ to their normal condition in readiness to be again raised by movement of their respective keys.

In the operation of the machine described the voter depresses or operates a key for each of the several candidates for whom he wishes to vote, he being free to vote for any candidate of any party whose name appears on the face of the machine. If, however, the voter should wish to cast his vote for a straight ticket—that is, a straight Republican, straight Democratic, or other ticket, to include all the names in the vertical series beneath the title of the particular ticket—I have provided the straight-ticket keys $b'$ referred to, one for each of the parties under which candidates are presented for election.

Referring now particularly to Figs. 1, 3, and 4, these straight-ticket keys $b'$ are mounted to slide in suitable bearings in the frame, as in the case of the keys $b$, and preferably distinguished from the latter at the front of the machine by larger finger-tips, and are provided, as shown, at their inner ends with lugs $b^{10}$, adapted to act upon one of the arms of the bell-crank levers $b^{11}$, loosely pivoted upon a shaft $b^{12}$, traversing the length of the frame, and having jointed to the free ends of their other arms at $b^{13}$ the upper ends of the rods $b^{14}$, one for each vertical series of counters, and which extend down alongside the rods $h^{28}$ referred to, and are provided with pins $b^{15}$, one for and beneath each of the counter-actuators $c'$. When either of these straight-ticket keys is pushed in, its lug $b^{10}$ turns the bell-crank lever $b^{11}$ on its pivot, raises the rod $b^{14}$, and through its pins $b^{15}$ raises simultaneously all the actuators of the counters in the same vertical series, thereby simultaneously registering a single vote for each of the candidates whose names appear in that vertical series and who are candidates of the particular party the name of which appears at the top of that series. The several straight-ticket keys are interlocked by interlocking devices $b^4$ precisely as are the keys $b$ in the same series.

To interlock the straight-ticket keys with the other horizontal series of keys below them, so as to prevent operation of the straight-ticket keys after operation of any of the other regular keys, I have provided the said straight-ticket keys with other lugs $b^{16}$, adapted to act upon arms $b^{17}$, fast upon a straight-ticket shaft $b^{18}$, shown as supported parallel to the resetting-shaft $h^{25}$ in suitable bearings in the frame, and which at its end adjacent the resetting-arm is provided with a series of curved arms $b^{19}$, of which there is one for and back of each grouping device, which arms are normally in position with their ends immediately over notches $b^{20}$ in the grooved pulleys $h^{13}$ of the said grouping devices.

With the machine in its normal condition throughout a voter may operate either one of the straight-ticket keys and by so doing will rotate the straight-ticket shaft and cause all of the arms $b^{19}$ to enter the notches $b^{20}$ in the grooved pulleys of the several grouping devices; but should any of the other keys $b$ have been previously operated for the casting of a vote or votes for individual candidates one or all of the grooved pulleys $h^{13}$ will have been rotated more or less and the notches therein will have been moved out of register with the arms $b^{19}$, and will therefore prevent downward movement of the said arms and rotative movement of the shaft $b^{18}$, so that none of the straight-ticket keys can be operated after the voter has once operated any one or more of the keys $b$, connected with a grouping device. The top series of keys $b$ is, however, not connected with either of the grouping devices, and to provide an interlocking mechanism for such series of keys I have provided the straight-ticket shaft $b^{18}$ with a fourth arm $b^{21}$, (see Figs. 1, 2, 3, and 7,) to the free end of which is jointed at $b^{22}$ the upper end of a rod $b^{23}$, which extends downwardly to the bottom of the machine and is provided adjacent the ends of the several sliding interlocking members $d$ with forwardly-projecting pins $b^{24}$. With the straight-ticket shaft in its normal position prior to operation of any of the straight-ticket keys this rod $b^{23}$ is in its elevated position with the pins $b^{24}$ above the lines or paths of movement of the several interlocking members $d$. If, however, any one of the keys $b$ is operated, movement of its sliding interlocking member $d$ to the left will carry its end beneath one of the pins $b^{24}$ on the rod $b^{23}$ and will prevent depression of the same, and consequently will prevent operation of any of the straight-ticket keys, and vice versa. If either of the straight-ticket keys is first operated, it will act to depress the rod $b^{23}$ and carry all its pins in front of—that is, in the paths of movement of—the several interlocking members $d$, and will prevent endwise movement of the said interlocking members, and will consequently prevent subsequent operation of any of the keys $b$ for individual voting.

When any of the horizontal series of keys is unconnected with a grouping device—that is, when a single officer is to be elected from a single horizontal series—there is nothing to return its sliding interlocking member $d$ to its normal position at the right except the resetting device. Hence when one key is operated the interlocking member fails to return, thereby locking all the other keys in the same series until the voter leaves the machine and the latter is reset.

When any horizontal series is connected in a group with others, its interlocking bar $d$ is returned after each operation for any except the last, repeating being guarded against by the counters, which will register a single vote only between any two operations of the resetting device, thus rendering it useless to operate the same key twice in succession, and, further, by the grouping devices, which limit the whole number of keys operated in any group, and, still further, by the interlocking devices, which prevent simultaneous operation of any two keys in the same group.

Referring now to Figs. 1, 2, 3, 17, and 17$^a$, and also 24, I will describe the independent or irregular voting device, of which in my invention only one is employed. Mounted in the front and back frames is a sliding key $w$, practically similar in construction to the straight-ticket keys and interlocked in similar manner with them and with the other keys of the machine. This key $w$, however, differs from the others in one respect—viz, it is provided near its front end with an upright sliding inclined ballot or card receiver $w'$, shown as a plate, having its ends overturned at $w^2$, Fig. 17$^a$, and also 24, to leave a slot $w^3$, in which the ballot or card may be dropped, the bottom of this slot $w^3$, when the key is in its normal outermost position, being closed by a table $w^4$, projecting from the face-plate of the machine. When the key is pushed inwardly, the slot $w^3$ leaves the table and is positioned over the entrance to a downwardly-inclined chute $w^5$, at the bottom of which is a suitable receptacle to contain the irregular or independent ballot cast. To insure proper delivery of the ballot from the receiver $w'$ into the chute $w^5$, I have provided an ejector, shown as a finger $w^7$, pivoted upon a short shaft $w^8$, journaled in the rear of the machine and having its free end forked, the two arms $w^9$ of the fork standing in position immediately over the ballot-receiver. The resetting-shaft is provided (see Fig. 17) with a rearwardly-extended arm $w^{10}$, connected by a link $w^{11}$ with the finger $w^7$, so that when the resetting-shaft is turned to reset the machine the finger $w^7$ will be depressed, causing the forked end of the arm $w^7$ to push the ballot or card downwardly from the receiver into the chute. In the present construction the card or ballot receiver is provided with two recesses or grooves $w^{12}$, in which the ends of the forked finger may travel to enable the said ends to be carried past—that is, made to overlap—the top of the ballot or ticket, and thus insure accurate delivery of the same. Immediately above the ballot-receiver I have provided the face of the machine with a hood or guard-plate $w^{13}$, which acts to cover the top or inlet end of the receiver-slot immediately after the inward movement of the key and its receiver is begun.

The operation of this device is as follows, viz: If the voter wishes to vote for any individual whose name is not displayed against any of the regular individual-voting keys, he is required to take from a suitable receptacle a blank ballot, preferably of cardboard, and to write thereon the names of all the individuals for all the different offices for whom he wishes to cast his vote and then deposit the card in the receiver and by means of the key pushes the receiver back to carry it beneath the overhanging hood or guard $w^{13}$, which prevents his withdrawing the ballot after it has once been placed in the receiver, the latter being pushed in until the receiving-slot $w^3$ reaches a position over the downwardly-inclined chute, in which position the key and its receiver are locked by the interlocking member $d$. When the machine is reset, the finger $w^7$ acts as an ejector to push the plate into the chute. The irregular-voting device $w$ being interlocked with all the remaining keys of the machine renders it impossible to operate it after any of the others have been operated and also impossible to operate any of the others after it has been operated. The slot in the receiver is of a depth such as will easily receive the pasteboard ballot, but not of such width as will permit insertion of two ballots by any voter at once.

It is evident that no voter can cast a second vote for the same individual for the same office, for the names of the parties of all the individuals voted for must appear on his single ballot, and if he writes the name of the same individual twice it will at once be apparent to the one counting the ballots at the close of the election.

Referring now to Figs. 19 to 22 and 25 and 26, my novel booth, which contains the voting-machine when in use, consists, in the form shown, of a back $n$, to which are attached the fixed end pieces $n'$ $n'$. To the opposite end pieces $n'$ are hinged at $n^2$, respectively, the sides or frames $n^3$ and $n^4$, in which are hinged at $n^5$ $n^6$, respectively, the inlet and exit doors $n^7$ $n^8$, arranged, as shown, at opposite sides of the booth. The side frames $n^3$ $n^4$ are shown as connected by a front wall or partition $n^9$, attached thereto by suitable fastening devices, herein shown as hooks $n^{10}$. To admit light and air to the interior of the compartment, I provide one or more walls thereof—herein the front wall or compartment—with one or more panels or slats $n^{11}$, similar to blind-slats. These blind-slats (see Fig. 23) are preferably made of suitable shape and suitable bright material or metal—such as nickel, tin, or the like—to enable them to serve as reflecting-slats to bar observation from the exterior to the interior of the booth and at the same time serve as reflecting-slats to reflect downwardly-inclined rays of light falling upon them upwardly in an inclined direction and for the illumination of the interior of the booth. To this end the slats, as herein shown, are formed to present horizontal or substantially horizontal portions $n^{11x}$ at their outer edges—that is, adjacent the outside of the booth—to which, respectively, are joined the upwardly and inwardly inclined screening portions $n^{11xx}$, so that the rays of light falling diagonally upon the top surfaces of the horizontal portions will be reflected upwardly to the interior of the booth between adjacent inclined or screening portions of the slats. At the same time the V-shaped formation of the slats is such that the convex under side of one intercepts the side from one to the other of the top edges of the next below, so that observation from the outside to the interior of the booth is effectually prevented.

Referring to Fig. 22, I have shown a second or double back wall $n^{12}$, separated from the back wall proper, $n$, by a space equivalent to the depth of the voting-machine, as shown, and to this inner or second wall $n^{12}$ I have hinged the floor $n^{13}$ of the booth, the hinge being shown at $n^{14}$. The free end of the floor, when the booth is not occupied, is held in an elevated position (indicated in dotted lines, Fig. 22) by one or more springs $n^{15}$, and when the booth is occupied the floor is depressed by the weight of the occupant into the full-line position, supported at its free end in suitable brackets or supports $n^{16}$.

The voting-machine previously described is arranged at A, its resetting-lever $h^{26}$ being connected by a rod $h^{30}$ with one end $h^{31}$ of a lever or arm $h^{32}$, bolted or otherwise secured to or upon the booth-floor, so that when the said floor is raised into its dotted position the said arm $h^{32}$ will, through the rod $h^{30}$, act to depress the resetting-lever $h^{26}$ to partially reset the machine for a new voter, the resetting being completed by the return movement of the lever due to the depression of the floor by the entrance of a voter into the booth.

I have herein shown the end $h^{31}$ of the arm $h^{32}$ hinged to the latter at $h^{33}$ to enable it to be more easily folded, as will be hereinafter described.

Referring now to Fig. 21, the entrance-door $n^7$ is provided with a suitable spring latch or lock $o$, having its spring latch-bolt $o'$ arranged opposite an opening $o^2$ in the door-frame and adapted to catch behind an ear $o^3$ at one side of the vertical latch-bar $o^4$, loosely connected at its lower end to the free end of the hinged floor $n^{13}$. When the floor is raised by the springs, the latch-bar is also raised, moving the ear $o^3$ up from behind the spring latch-bolt $o'$, permitting a spring $n^{7\times}$ (see Fig. 21) to open the door, slightly at least, the latch-bolt $o'$ passing outwardly through the recess $o^2$ in the door-frame. In the present instance I have extended the latch-bar $o^4$ upwardly above the ear $o^3$ to the top of the booth and have provided it just above the ear with a second ear $o^5$, with which coöperates a suitable lock $o^6$, of usual construction, having its bolt $o^7$ so arranged that if extended when the floor is in its elevated position it will pass under the ear $o^5$ and hold the latch-bar $o^4$ and the floor in their elevated positions, the lock $o^6$ being operated by a suitable key from the exterior of the booth. The spring-latch $o$ is provided either at the exterior or the interior of the booth with a knob or device by which it can be operated. The upper end of the latch-bar $o^4$ near the top of the booth is jointed to one arm of a bell-crank lever $p$, pivoted to the booth at $p'$ and having its other arm connected by a tension-spring $p^2$ with a lever $p^3$, pivoted at $p^4$ and connected at the opposite side of its pivot with a strap or flexible connection $p^5$, passed about a segment $p^6$ upon and secured to the door.

When the booth is unoccupied, the floor $n^{13}$ is raised by its springs $n^{15}$, thereby moving the bell-crank lever $p$ in the direction of the arrow and relieving the tension of the spring $p^2$, so that the latter exerts no force tending to close the booth-door. When the voter steps upon the booth-floor and depresses the same, the latch-bar $o^4$ is also depressed, thereby turning the bell-crank lever in a direction opposite the arrow, Fig. 21, and exerting a tension upon the spring $p^2$ sufficient to act through the strap $p^5$ and segment $p^6$ to close the door automatically, even against the action of the spring $n^{7\times}$, the door automatically locking when closed.

Referring now to Figs. 19, 20, and 22, the exit-door is provided, herein near its top, with an inwardly-projecting arm $r$, provided (see Fig. 20) with two notches $r'$ and $r^2$, one located close to the door and the other near the end of the arm, and coöperating with this notched arm is a pivoted latch or dog $r^3$, which when the door is closed drops into the notch nearest the door and holds the latter closed. To raise the latch or dog $r^3$ to enable the door to be opened, I have provided the door with a rotatable knob $r^4$, having an arm $r^5$, to which is jointed the lower end of a lifting-bar $r^6$, slotted at $r^7$ near its upper end to receive the guiding screw or pin $r^8$ and having its upper end $r^9$ turned outwardly to a length substantially equal to that of the notched arm $r$, so that rotation of the knob lifts the latch or dog $r^3$ and permits the door to be opened. To restrain the floor from rising until after the exit-door has been nearly or quite closed and locked, I have provided the resetting-shaft (see Figs. 20 and 22) with an arm $t$, which when the exit-door is opened is caught under and held by a spring-controlled dog $t'$, which prevents rotation of the resetting-shaft, and thereby prevents the rising of the floor and resetting of the machine so long as the exit-door is open. The exit-door, however, is provided with an arm $t^2$, which when the door is nearly or quite closed strikes the dog $t'$ and disengages the same from the arm $t$, releasing the resetting-shaft and permitting the floor to rise and, through its connecting-rod $h^{30}$, move the resetting mechanism.

In use the condition of the booth when unoccupied is with the exit-door closed and locked by the dog $r^3$ and the inlet-door opened slightly under the action of the flat spring $n^{7\times}$, the floor being in its elevated position. The voter enters the booth, steps upon the floor and depresses the same, and thereby puts a tension upon the spring $p^2$, which automatically closes and locks the door after him, as described. He then operates the voting-machine to cast his vote for the desired candidate, as described, and to leave the booth turns the knob $r^4$, and thereby unlocks the exit-door, which he opens, and leaves the booth, the floor, however, being held in its lowermost position by the dog $t'$, holding the arm $t$ on the resetting-shaft connected with the floor, as described. The exit-door $n^8$ is quickly closed after the voter leaves the booth by a spring, as $n^{8\times}$, and is automatically locked by the pivoted dog $r^3$, and as soon as the exit-door is closed the hinged floor is, by the springs $n^{15}$, raised, as described, it acting through the rod $h^{30}$ to partially reset the voting-machine, the resetting movement being completed by the subsequent depression of the floor on the entrance of the next voter into the booth. The voter having once cast his vote and opened the exit-door cannot afterward return and cast a second vote or votes, because the machine cannot be reset (which is necessary for a second voting) except by the raising of the hinged floor, and the hinged floor cannot be raised until the exit-door is completely closed and no person is upon it.

It is impossible for the voter on leaving the booth to almost close the exit-door, so as to disengage the dog $t$ and resetting-shaft and permit the floor to rise to partially reset the voting-machine, and afterward open the door to complete the resetting movement and cast a second vote, for the reason that when the door is sufficiently closed to disengage the dog $t$ to permit the floor to be raised the latch or dog $r^2$ will drop into the notch $r^3$ in the arm $r$ on the door and prevent the door being again opened sufficiently to permit the voter to enter therethrough, it being possible after that to enter only through the entrance-door.

Referring now to Fig. 21, $s$ is a gong the hammer $s'$ of which is mounted upon one arm of a bell-crank lever $s^2$, pivoted at $s^3$ and having the end of its other arm provided with a pin entering a slot $s^4$ in the end of a rod $s^5$, connected with the bell-crank lever $p$. The hammer-carrying arm of the bell-crank lever is herein shown as provided with a pin $s^6$, adapted to rest upon the surface of a volute or other suitable cam $s^7$, frictionally connected with and adapted to be rotated by a suitable clock or time mechanism, only one wheel $s^8$ of which is shown. A pulley $s^9$, fast on the cam $s^7$, is connected by a cord or belt $s^{10}$ with the hammer-arm, the operation being as follows, viz: When the voter leaves the booth, the rising of the floor, acting through the latch-bar $o^4$, bell-crank lever $p$, and rod $s^5$, causes the bell-crank lever $s^2$ to be raised, thereby, through the cord $s^{10}$, returning the cam $s^7$ to its starting-point, it being held in this position, notwithstanding the continued movement of the time-train, by the lever in its elevated position. When the voter enters the booth and depresses the floor, the rod $s^5$ is drawn to the right, dropping the hammer-lever upon the cam and at the same time slackening the cord $s^{10}$ to permit the time movement to thereafter frictionally rotate the cam, which gradually raises the hammer-lever until the highest point of the cam is reached, which when passed drops the hammer upon and to sound the gong, indicating to the election-overseers that the time allotted to any single voter has expired. The slot $s^4$ in the rod $s^5$ is necessary to permit the hammer to drop from the highest to the lowest point of the cam to sound the gong. When the hammer-lever is raised by raising of the floor, it is raised to a considerable distance above the cam, the length of the cord connecting the lever with the cam determining the extent of resultant rotation given the cam, the greater the rotation by the upward movement of the lever the longer will be the period required by the time movement subsequently in returning the cam, so as to drop the hammer. Thus by varying the length of the cord $s^{10}$ the time intervening between the entrance of the voter and the sounding of the gong may be varied at will.

I have herein provided a visual indicator to be used in connection with the gong or audible alarm, the same in the present instance of my invention comprising a dial or card $u$, shown as suspended by a cord or wire $u'$ from the hammer-lever $s^2$. When the hammer-lever drops to sound the gong, the indicator-card $u$ is also dropped and exposed to view by one outside the booth behind the opening $u^2$, so that if several booths are grouped together and the gong sounds the overseer outside the booth has but to glance at the several booths to see at which one the visual indicator is displayed to know in what booth the voter has remained beyond his allotted time. When the voter leaves the booth, the open entrance-door shows that it is unoccupied, and as soon as the next voter enters depression of the floor raises the hammer-lever and also the indicator above and out of view through the opening $u^2$.

So far as known to me I am the first to employ an audible alarm and visual indicator either singly or together in connection with a voting booth or machine and consider myself entitled to claim the same broadly without regard to the particular construction or operation of the same.

As herein shown, the back of the booth is provided with two doors $n^x$ $n^{xx}$, which may be opened to expose the back of the voting-machine and the counters thereat when the election is finished or when, during the election, it is desired by the proper officials to determine the progress of the election. In order, however, to prevent tampering with the counters when these doors are opened to view the same, I have provided (see Figs. 2 and $2^a$) a series of sliding shields $j$, one for each horizontal series of counters and mounted in suitable bearings $j'$, which enable them to have a sliding movement from right to left, and vice versa. These sliding shields $j$ are provided with holes $j^2$, equaling in number the number of the arbors $c^x$ in the counters, which are squared to furnish means, through the use of a suitable key, for returning the counters to their normal positions—that is, to zero. In the normal operation of the machine, however, these shields $j$ are slid to one side, herein to the right, so that their holes $j^2$ do not register with the ends of these resetting-arbors of the counters, so that the said arbors are concealed from view and access to prevent tampering by any person who may wish to change the result of the vote. To lock these shields in their positions covering the resetting-arbors of the counters, I have provided a vertical bar $j^3$, adapted to slide in suitable bearings, as shown, and provided with a series of vertical slots $j^4$ for the respective sliding shields $j$, the latter having notches $j^5$ near their ends, into which the said vertical sliding bar $j^3$ may be dropped to thereby lock all the shields against movement, the bar $j^3$ being itself locked in suitable manner by a suitable locking device $j^6$, preferably operated only through the medium of a key in the possession of the election-overseer. For access to the counters after resetting the same at zero at the close of the election the vertical bar $j^3$ must first be unlocked and raised to thereby remove it from engagement from the notches $j^5$ in the several shields, and thereafter the latter may be freely moved through the slots $j^4$ in the vertical bar to bring their openings $j^2$ into register with the resetting-arbors of the counters, which latter may be operated to restore the counters to zero.

My invention is not limited to the particular interlocking devices herein shown, nor is my invention limited to the particular resetting mechanism shown, as any mechanism the operation of which is required to place the machine in readiness for a new voter is included within that term.

By the grouping device is included any device for limiting the aggregate number of keys operated in any group of keys for candidates for the same office.

After the voting is finished the booth is collapsed by first detaching the front, then turning the bottom or floor up, and turning the side arms inwardly against the face of the voting-machine.

The end of the frame $h^{31}$ is hinged at $h^{33}$ to enable it to be turned back upon the remaining portion of the arm to facilitate collapsing of the booth.

I claim—

1. In a voting-machine a plurality of registering-keys; interlocking devices and separators actuated by the respective keys to separate said interlocking devices and thereby prevent simultaneous operation of said separators; means to automatically withdraw said separators from between said interlocking devices after each operation of the respective keys; counters for and actuated by the respective registering-keys; a resetting device, and means to prevent a plurality of operations of said counters by their respective keys between any two succeeding operations of said resetting device, substantially as described.

2. In a voting-machine, two or more series of registering-keys, means to prevent simultaneous operation of any two or more keys in the same or different series, a single grouping device and means to connect the same with and to be operated by the keys of either one or a plurality of series to limit the total number of keys operated by any single voter, and a single independent-voting device for the machine interlocked with said registering-keys, substantially as described.

3. In a voting-machine, a plurality of registering-keys arranged in series and capable of repeated operation between two operations of the resetting mechanism, mechanism to automatically return said keys to their normal positions after each operation, means to prevent simultaneous operation of any two or more keys in the same series, a grouping device adapted to be connected with and operated by said keys, counters for the respective keys, resetting mechanism, means for preventing repeated operation of any counter by repeated operation of its key between two succeeding complete operations of said resetting mechanism, and a single independent-voting device for the machine interlocked with said registering-keys, to operate substantially as described.

4. In a voting-machine, a resetting mechanism, a group containing two or more series of registering-keys constructed to be operated and automatically returned to their normal positions between two complete operations of said resetting mechanism, one or more grouping devices adapted to be connected with and to control the number of said registering-keys to be operated means for preventing simultaneous operation of two or more keys connected with the same grouping device, counters for the respective registering-keys, means for preventing a plurality of operations of any of said counters by their respective keys between succeeding complete operations of said resetting mechanism, and a single independent-voting device for the machine interlocked with said registering-keys, substantially as described.

5. In a voting-machine, a series of registering-keys, counters operated by the respective keys, a resetting mechanism, locking mechanism for simultaneously locking against operation all the remaining keys of said series upon operation of one of said keys, said locking mechanism comprising a plurality of interlocking devices, separators therefor connected with and to be operated by the respective keys to separate said interlocking devices and thereby prevent simultaneous operation of said separators, and means operating independently of operation of said resetting mechanism to automatically withdraw said separators and thereby release said locking mechanism after operation of a key to permit operation of any of the remaining keys, substantially as described.

6. In a voting-machine, two or more series of individual-registering keys; counters for and operated by respective keys; and a separate series of straight-ticket keys operable independently of said individual keys, and adapted to be connected with and to operate said counters, substantially as described.

7. In a voting-machine, two or more series of individual-registering keys; counters for and operated by respective keys; and a separate series of straight-ticket keys operable independently of said individual keys, each connected with and to operate a plurality of said counters, substantially as described.

8. In a voting-machine, two or more series of registering-keys; two or more grouping devices; and means for connecting any of said series of keys with any of said grouping devices, substantially as described.

9. In a voting-machine, a plurality of registering-keys, a sliding member adapted to be moved by any one of said keys, a plurality of grouping devices, and means to connect any of the same with said sliding member, substantially as described.

10. In a voting-machine, two or more series of registering-keys, sliding members for and operated by keys of the respective series, two or more grouping devices, grouping members controlling operation of the same and arranged crossing the lines of movement of said sliding members, and means to connect any of said sliding members with any of said grouping members, substantially as described.

11. In a voting-machine, a plurality of registering-keys adapted respectively to be operated and again returned to their original positions previous to operation of the resetting mechanism; counters for and having actuators adapted to be moved by the respective keys; and a resetting mechanism for the machine, connected with and to reset said counter-actuators independently of the return movement of the keys which operated them, substantially as described.

12. In a voting-machine, a series of registering-keys; a plurality of step-by-step movable grouping devices, and a reciprocating sliding member reciprocated by and at each operation of the respective keys of said series, and means for connecting at will the said sliding member with and to impart step-by-step movement to either of said grouping devices, substantially as described.

13. In a voting-machine, the combination with two or more series of individual-registering keys, of a single independent-voting device for the machine, the same interlocked with all the individual keys, substantially as described.

14. In a voting-machine, the combination with two or more series of individual-registering keys, and a series of straight-ticket keys, of a single independent-voting device for the machine interlocked with said individual and straight-ticket keys, substantially as described.

15. In a voting-machine, the combination with two or more series of individual-registering keys of a single independent-voting device interlocked with all the said individual keys and containing a ballot-receiver; an ejector, and means to operate said ejector to discharge the independent ballot from said receiver, substantially as described.

16. In a voting-machine, an independent-voting device containing a movable ballot-receiver; means to move it from accessible into inaccessible position; an ejector, and means to operate it, substantially as described.

17. In a voting-machine, an independent-voting device containing a ballot-receiving device movably connected with the machine and through which the independent ballot is inserted, and means to move the said ballot-receiving device from accessible into inaccessible position after the insertion or casting of said ballot, substantially as described.

18. The combination with a voting-machine, of a booth for and having a movable part or parts connected with and controlling the operation of said voting-machine, or a part thereof, said booth having a self-closing entrance-door; a movable booth-floor, and automatic locking mechanism for said door rendered operative by depression of said floor, substantially as described.

19. The combination with a voting-machine, of a booth therefor having entrance and exit doors, and a vertically-movable floor; connection between said floor and exit-door, whereby raising of the floor is possible only when the door is nearly or quite closed; and resetting mechanism for said voting-machine connected with and moved by movement of said floor, substantially as described.

20. The combination with a voting-machine, of a booth for and having one or more movable parts connected with and to control the operation of said voting-machine, or a part thereof, said booth having entrance and exit doors, and a vertically-movable floor; resetting mechanism connected with and moved by said floor; means to prevent raising of said floor except when said exit-door is nearly or quite closed; and locking devices to prevent opening of said exit-doors when once closed sufficiently to enable said floor to rise; and releasing mechanism for said locking device operable only from the interior of the booth, substantially as described.

21. The combination with a voting-machine, of a booth for and having one or more movable parts connected with and controlling the operation of said voting-machine or a part thereof, said booth having entrance and exit doors, and a vertically-movable floor; resetting mechanism connected with and moved by said floor; a spring to open said entrance-door; and a closing-spring, and means operated by depression of said floor to render said closing-spring operative for closing said entrance-door, substantially as described.

22. The combination with a voting-machine, of a booth therefor having entrance and exit doors, and a vertically-movable floor; a resetting mechanism connected with and moved by said floor, and means operable from the exterior of the booth to lock said floor against vertical movement, substantially as described.

23. The combination with a voting-machine, of a booth therefor having one or more movable parts connected with and to govern the operation of said voting-machine or a part thereof, said booth containing one or more panels of reflecting-slats arranged and constructed to present horizontal outer edges and reflecting portions, and upwardly-inclined inner or screening portions joined thereto, forming convex slats with the convex portion of one slat intercepting the line of sight from one to another of the highest points of the concave surface of the next adjacent slat in the same panel, to thereby obstruct observation from the outside to the interior of the booth without interfering with the reflection of light from the outside to illuminate the interior of the said booth, substantially as described.

24. The combination with a voting-machine, and a booth therefor containing one or more moving parts connected with and to govern the operation of said voting-machine, or a part thereof, of a normally-concealed visual indicator, time mechanism to expose the same at the end of a predetermined interval provided the voter be in the booth at the end of such interval, and means connected with a movable part of the booth and operated by the exit of the voter therefrom within said predetermined time to prevent exposure of said indicator, substantially as described.

25. The combination with a voting-machine, and a booth therefor containing one or more movable parts connected with and to govern the operation of said voting-machine, or a part thereof, of an audible alarm, means to sound the same at the end of a predetermined interval provided the voter be in the booth, and means connected with a movable part of the booth and operated by or at the exit of the voter therefrom within said predetermined time to prevent sounding of said audible alarm, substantially as described.

26. The combination with a voting-machine, and a booth therefor provided with one or more movable parts connected with and to govern the operation of said voting-machine, or a part thereof, of a visual indicator, an audible alarm, time mechanism to expose said indicator and sound said alarm at the end of a predetermined interval, provided the voter be still within the booth, and means connected with a movable part of the booth and operated by or at the exit of the voter therefrom within said predetermined time to prevent exposure of said visual indicator and sounding of said audible alarm, substantially as described.

27. The combination with a voting-machine, of a booth therefor provided with one or more movable parts connected with and to govern the operation of said voting-machine, or a part thereof, said booth comprising a back, two sides hinged thereto, doors hinged to and having a swinging movement independent of the said hinged sides, and a front, substantially as described.

28. The combination with a voting-machine, of a booth therefor provided with one or more movable parts connected with and to govern the operation of said voting-machine, or a part thereof, said booth comprising a back, hinged sides, doors independent of and hinged to said sides, and a detachable front and means to secure the same to the said sides when extended, substantially as described.

29. The combination with a voting-machine, of a booth therefor having one or more movable parts connected with and to govern the operation of the voting-machine, or a part thereof, said booth containing a booth-back, to which the voting-machine is secured, and sides for the booth hinged to the said back and adapted to swing back toward and in front of and concealing the said voting-machine, doors independent of and hinged to the respective hinged sides, and in front, substantially as described.

30. The combination with a voting-machine, of a booth therefor containing one or more movable parts connected with and to govern the operation of said voting-machine, or a part thereof, said booth comprising a back, a floor hinged thereto and adapted to swing upwardly; two sides hinged to the said back and adapted to swing inwardly, doors independent of and hinged to said hinged sides, and a front, substantially as described.

31. A voting-machine, containing one or more series of registering-keys, counters for the respective keys, provided each with a resetting-arbor, a single shield device for a plurality of said counters and adapted to be moved into and out of position concealing the resetting-arbors of said counters, substantially as described.

32. A voting-machine containing a series of registering-keys, counters for the same provided each with one or more resetting-arbors, shields for the counters provided with openings adapted when in one position to register with and admit access to the said arbors, and when in another position, to be offset from and concealing the said arbors, and locking mechanism to retain the said shields normally in their offset positions concealing the said arbors, substantially as described.

33. A voting-machine containing one or more series of registering-keys, and counters for the respective keys, provided each with one or more resetting-arbors; a single shield for each series of counters; and a locking device to retain the same in position concealing the arbors of all the counters, substantially as described.

34. A voting-machine containing two or more series of registering-keys, sliding bars for and actuated by the keys of the respective series, interlocking devices between the said bars, and counterbalances for the said interlocking devices, substantially as described.

35. In a voting-machine, two or more series of keys, interlocking devices between keys of different series, and counterbalances for the said interlocking devices, substantially as described.

36. In a voting-machine, two or more series of individual-registering keys, and one or more grouping devices adapted to be connected with said series of registering-keys and containing each a rotatable member provided with a notch, a separate series of independently-operated straight-ticket keys, a shaft adapted to be rotated by operation of any of said straight-ticket keys, one or more arms on the said shaft for the respective grouping devices and adapted upon operation of any straight-ticket key in advance of a registering-key to enter the notch in one of said rotatable members to thereby lock the grouping device of which said member is a part and all registering-keys connected therewith against operation, prior operation of any of the said registering-keys moving the rotatable member of its grouping device to carry said notch out of its normal position and preventing entrance of its coöperating arm on said shaft and thereby prevent subsequent operation of said straight-ticket keys, substantially as described.

37. In a voting-machine, two or more series of individual-registering keys, a separate series of independently-operated straight-ticket keys, a shaft rotated by operation of any straight-ticket key and a slide-bar reciprocated by said shaft, sliding members adapted to be moved by operation of any of the keys of the respective series of registering-keys, and projections on the said slide-bar coöperating with the said sliding members whereby prior operation of any sliding member prevents subsequent operation of said slide-bar and straight-ticket keys, and vice versa, operation of a straight-ticket key and slide-bar prevents subsequent operation of said sliding members, and a resetting mechanism, substantially as described.

38. In a voting-machine, two or more series of individual-registering keys, and a separate series of independently-operated straight-ticket keys, sliding members for and operated by the keys of the respective series of registering-keys, one or more grouping devices connected with some of said slide-bars and their respective series of registering-keys and not with others, a rotatable shaft connected with and rotated by operation of any of the said straight-ticket keys, and means to prevent operation of the said grouping device or devices after operation of said shaft, a slide-bar adapted to be reciprocated by rotation of said shaft, and projections thereon coöperating with said sliding members to operate, substantially as described.

39. The combination with a voting-machine containing a plurality of counters and registering-keys for the same, of a booth having entrance and exit doors, a vertically-movable floor, means whereby said floor in its elevated position locks said counters against movement or manipulation, and locking devices for and to lock said movable floor, substantially as described.

40. The combination with a voting-machine, of a booth therefor having one or more moving parts connected with and to govern the operation of said voting-machine, or a part thereof, said booth being provided with independent entrance and exit doors, and locking devices therefor rendered operative by the presence of a voter in the booth, and inaccessible from the exterior of the booth to automatically lock both said doors against opening from the exterior during the presence of a voter within the booth, substantially as described.

In testimony whereof I have signed my name to this specification in the presence of two subscribing witnesses.

ALBERT SNOECK.

Witnesses:
FREDERICK L. EMERY,
JOHN C. EDWARDS.